(12) United States Patent
Mori

(10) Patent No.: US 9,710,736 B2
(45) Date of Patent: Jul. 18, 2017

(54) RENDERING APPARATUS AND RENDERING METHOD

(71) Applicant: CANON KABUSHIKI KAISHA, Tokyo (JP)

(72) Inventor: Hiroshi Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/627,329

(22) Filed: Feb. 20, 2015

(65) Prior Publication Data

US 2015/0248598 A1    Sep. 3, 2015

(30) Foreign Application Priority Data

Mar. 3, 2014   (JP) .................. 2014-040885

(51) Int. Cl.
| | |
|---|---|
| *G06K 15/02* | (2006.01) |
| *G06F 3/12* | (2006.01) |
| *G06K 15/00* | (2006.01) |

(52) U.S. Cl.
CPC ....... *G06K 15/1823* (2013.01); *G06K 15/005* (2013.01); *G06K 15/1849* (2013.01); *G06K 15/1851* (2013.01)

(58) Field of Classification Search
None
See application file for complete search history.

(56) References Cited

U.S. PATENT DOCUMENTS

| | | | | |
|---|---|---|---|---|
| 4,888,712 A | * | 12/1989 | Barkans ................. | G06T 15/30 345/627 |
| 5,124,693 A | * | 6/1992 | Himelstein et al. ......... | 345/427 |
| 5,473,741 A | * | 12/1995 | Neufelder ............. | G06K 15/00 345/619 |
| 5,912,672 A | * | 6/1999 | Liguori ....................... | 345/619 |
| 5,966,136 A | * | 10/1999 | Kurtz ..................... | G06T 15/30 345/620 |
| 6,132,116 A | * | 10/2000 | Yoshikawa .......... | G06F 3/1204 101/483 |
| 6,348,969 B1 | * | 2/2002 | Ikeda ..................... | G06K 15/12 358/1.15 |
| 6,466,229 B1 | * | 10/2002 | Nagao ....................... | G06T 1/60 345/621 |
| 6,963,412 B1 | * | 11/2005 | Toda ........................... | 358/1.13 |
| 7,602,514 B2 | * | 10/2009 | Levin et al. ............... | 358/1.15 |
| 7,616,218 B1 | * | 11/2009 | Parikh ................. | G06F 12/1027 345/619 |
| 2001/0043345 A1 | * | 11/2001 | Rumph ................ | G06F 3/1208 358/1.9 |

(Continued)

FOREIGN PATENT DOCUMENTS

| | | | | |
|---|---|---|---|---|
| JP | 2002-103697 | * | 4/2002 | ............... B41J 5/30 |
| JP | 2011-227565 | * | 11/2011 | ............. G06T 11/20 |
| JP | 2011-239071 | | 11/2011 | |

*Primary Examiner* — Beniyam Menberu

(74) *Attorney, Agent, or Firm* — Fitzpatrick, Cella, Harper & Scinto

(57) ABSTRACT

A rendering apparatus of the present invention determines one of a plurality of estimation methods used for estimating a time required to render printing data, on a basis of features of a plurality of rendering objects included in the printing data, and estimates the time required to render the printing data by the determined method.

10 Claims, 18 Drawing Sheets

(56) References Cited

U.S. PATENT DOCUMENTS

| | | | |
|---|---|---|---|
| 2003/0011819 A1* | 1/2003 | Toda | H04N 1/00002 358/1.15 |
| 2003/0025938 A1* | 2/2003 | Iida | 358/1.15 |
| 2006/0109275 A1* | 5/2006 | Cho | G06T 15/40 345/522 |
| 2007/0139742 A1* | 6/2007 | Bourdev | G06K 15/02 358/527 |
| 2007/0168939 A1* | 7/2007 | Clark et al. | 717/108 |
| 2007/0195353 A1* | 8/2007 | Tsunoda | 358/1.13 |
| 2009/0201522 A1* | 8/2009 | Iguchi | G06K 15/02 358/1.9 |
| 2010/0245889 A1* | 9/2010 | Nguyen | G06F 3/1205 358/1.15 |
| 2011/0255098 A1* | 10/2011 | Ito | H04N 1/387 358/1.2 |
| 2012/0287476 A1* | 11/2012 | Sonogi | H04N 1/40 358/3.01 |
| 2014/0029047 A1* | 1/2014 | Giannetti | G06F 3/1212 358/1.15 |
| 2014/0085657 A1* | 3/2014 | Segawa | G06F 3/1298 358/1.13 |

* cited by examiner

| REGION | NUMBER OF OBJECTS |
|---|---|
| RECTANGULAR REGION(X,Y) (0,0),(500,500) | ONE |
| RECTANGULAR REGION(X,Y) (500,0),(500,500) | FOUR |
| ...... | ...... |
| RECTANGULAR REGION(X,Y) (4500,6500),(5000,7000) | ZERO |

FIG.4

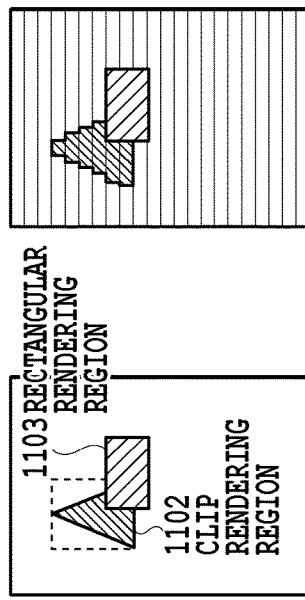

1101 PAGE IMAGE
1102 CLIP RENDERING REGION
1103 RECTANGULAR RENDERING REGION
1110 PAGE AFTER HIDDEN SURFACE REMOVAL

PARAMETERS AFTER HIDDEN SURFACE REMOVAL IN CLIP RENDERING REGION (1102)
1120 {
- NUMBER OF CLOSED REGIONS: 1, NUMBER OF OBJECTS: 1, NUMBER OF PIXELS: 1
- NUMBER OF CLOSED REGIONS: 1, NUMBER OF OBJECTS: 1, NUMBER OF PIXELS: 3
- NUMBER OF CLOSED REGIONS: 1, NUMBER OF OBJECTS: 1, NUMBER OF PIXELS: 5
- NUMBER OF CLOSED REGIONS: 1, NUMBER OF OBJECTS: 1, NUMBER OF PIXELS: 7
- NUMBER OF CLOSED REGIONS: 1, NUMBER OF OBJECTS: 1, NUMBER OF PIXELS: 5
- NUMBER OF CLOSED REGIONS: 1, NUMBER OF OBJECTS: 1, NUMBER OF PIXELS: 6
}

PARAMETERS AFTER HIDDEN SURFACE REMOVAL IN RECTANGULAR RENDERING REGION (1103)
1130 {
- NUMBER OF CLOSED REGIONS: 1, NUMBER OF OBJECTS: 1, NUMBER OF PIXELS: 8
- NUMBER OF CLOSED REGIONS: 1, NUMBER OF OBJECTS: 1, NUMBER OF PIXELS: 8
- NUMBER OF CLOSED REGIONS: 1, NUMBER OF OBJECTS: 1, NUMBER OF PIXELS: 8
}

RENDERING PORTION:
  TOTAL NUMBER OF CLOSED REGIONS: 9, TOTAL NUMBER OF OBJECTS IN CLOSED REGIONS: 9,
  TOTAL NUMBER OF CLOSED REGION PIXELS: 48

BLANK PORTION:
  TOTAL NUMBER OF CLOSED REGIONS: X,
  TOTAL NUMBER OF OBJECTS IN CLOSED REGIONS: 0

FIG.11

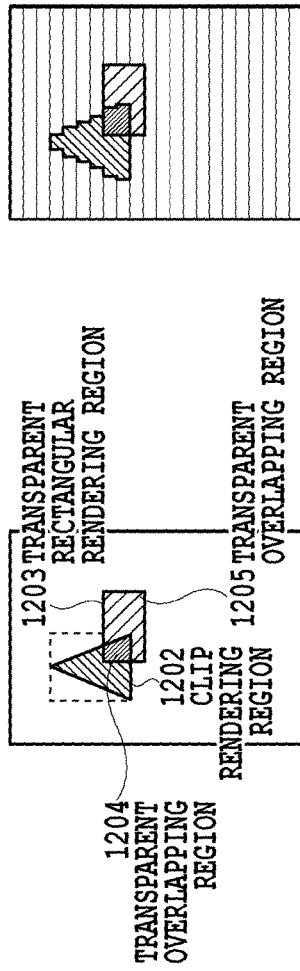

1201 PAGE IMAGE
1202 CLIP RENDERING REGION
1203 TRANSPARENT RECTANGULAR RENDERING REGION
1204 TRANSPARENT OVERLAPPING REGION
1205 TRANSPARENT OVERLAPPING REGION
1210 PAGE AFTER HIDDEN SURFACE REMOVAL

PARAMETERS AFTER HIDDEN SURFACE REMOVAL IN CLIP RENDERING REGION (1202)

1220
- NUMBER OF CLOSED REGIONS: 1, NUMBER OF OBJECTS: 1, NUMBER OF PIXELS: 1
- NUMBER OF CLOSED REGIONS: 1, NUMBER OF OBJECTS: 1, NUMBER OF PIXELS: 3
- NUMBER OF CLOSED REGIONS: 1, NUMBER OF OBJECTS: 1, NUMBER OF PIXELS: 5
- NUMBER OF CLOSED REGIONS: 1, NUMBER OF OBJECTS: 1, NUMBER OF PIXELS: 7
- NUMBER OF CLOSED REGIONS: 1, NUMBER OF OBJECTS: 1, NUMBER OF PIXELS: 5
- NUMBER OF CLOSED REGIONS: 1, NUMBER OF OBJECTS: 1, NUMBER OF PIXELS: 6

PARAMETERS AFTER HIDDEN SURFACE REMOVAL IN TRANSPARENT OVERLAPPING REGION (1204)

1230
- NUMBER OF CLOSED REGIONS: 1, NUMBER OF OBJECTS: 2, NUMBER OF PIXELS: 4
- NUMBER OF CLOSED REGIONS: 1, NUMBER OF OBJECTS: 2, NUMBER OF PIXELS: 5

PARAMETERS AFTER HIDDEN SURFACE REMOVAL IN TRANSPARENT OVERLAPPING REGION (1205)

1240
- NUMBER OF CLOSED REGIONS: 1, NUMBER OF OBJECTS: 1, NUMBER OF PIXELS: 4
- NUMBER OF CLOSED REGIONS: 1, NUMBER OF OBJECTS: 1, NUMBER OF PIXELS: 3
- NUMBER OF CLOSED REGIONS: 1, NUMBER OF OBJECTS: 1, NUMBER OF PIXELS: 8

RENDERING PORTION:
TOTAL NUMBER OF CLOSED REGIONS: 11, TOTAL NUMBER OF OBJECTS IN CLOSED REGIONS: 13,
TOTAL NUMBER OF CLOSED REGION PIXELS: 51

BLANK PORTION:
TOTAL NUMBER OF CLOSED REGIONS: X, TOTAL NUMBER OF OBJECTS IN CLOSED REGIONS: 0

FIG.12

RENDERING APPARATUS AND RENDERING METHOD

BACKGROUND OF THE INVENTION

Field of the Invention

The present invention relates to a rendering apparatus and a rendering method for estimating a processing time required for rendering processing.

Description of the Related Art

Conventionally, there has been proposed a technique of notifying a user intending to perform printing processing of a time required for the printing processing. The printing processing includes the following processing. Specifically, page description language (PDL) data inputted with an instruction of the printing processing is analyzed to generate intermediate data; then, bitmap image data is generated from the generated intermediate data; and printing is performed based on the bitmap image data. Generally, processing which requires a long time in the printing processing is the processing of generating the bitmap image data from the intermediate data. In the following description, the time required for the processing of generating the bitmap image data from the intermediate data is referred to as processing time required for the image formation processing or simply image formation time.

Japanese Patent Laid-Open No. 2011-239071 proposes a technique of estimating the aforementioned image formation time from the number and sizes of rendering objects included in rendering information on a page shown by the PDL data.

However, estimation of the image formation time using the aforementioned image formation time estimation technique has a problem that the image formation time cannot be accurately estimated for some of image formation processing methods.

For example, image formation processing using a generally-known scan line method forms an image by performing hidden surface removal for each scan line while omitting image formation of an invisible region of an object hidden by another object overlapping in the foreground. The technique of Japanese Patent Laid-Open No. 2011-239071 performs the estimation simply based on the number and sizes of the rendering objects, and therefore estimates the processing time assuming that an object, which lies behind another object and is not actually formed, is to be formed. Accordingly, this technique has a problem that an accurate image formation time cannot be estimated due to inclusion of a time required for irrelevant data which are eventually hidden (data prevented from being rendered). For example, an image formation time longer than the actual time required for the image formation processing is sometimes estimated.

SUMMARY OF THE INVENTION

A rendering apparatus of the present invention comprises: a determining unit configured to determine one of a plurality of estimation methods used for estimating a time required to render printing data, on a basis of features of a plurality of rendering objects included in the printing data; and an estimating unit configured to estimate the time required to render the printing data by the determined method.

The present invention can improve the accuracy of estimating the image formation time.

Further features of the present invention will become apparent from the following description of exemplary embodiments (with reference to the attached drawings).

BRIEF DESCRIPTION OF THE DRAWINGS

FIG. 4 is a view showing an example of a table managing density of objects in first embodiment;

FIG. 11 is a view for explaining detailed contents of the estimation processing of "parameters after the hidden surface removal" in first embodiment;

FIG. 12 is a view for explaining detailed contents of the estimation processing of "parameters after the hidden surface removal" in first embodiment;

DESCRIPTION OF THE EMBODIMENTS

Figure 1:
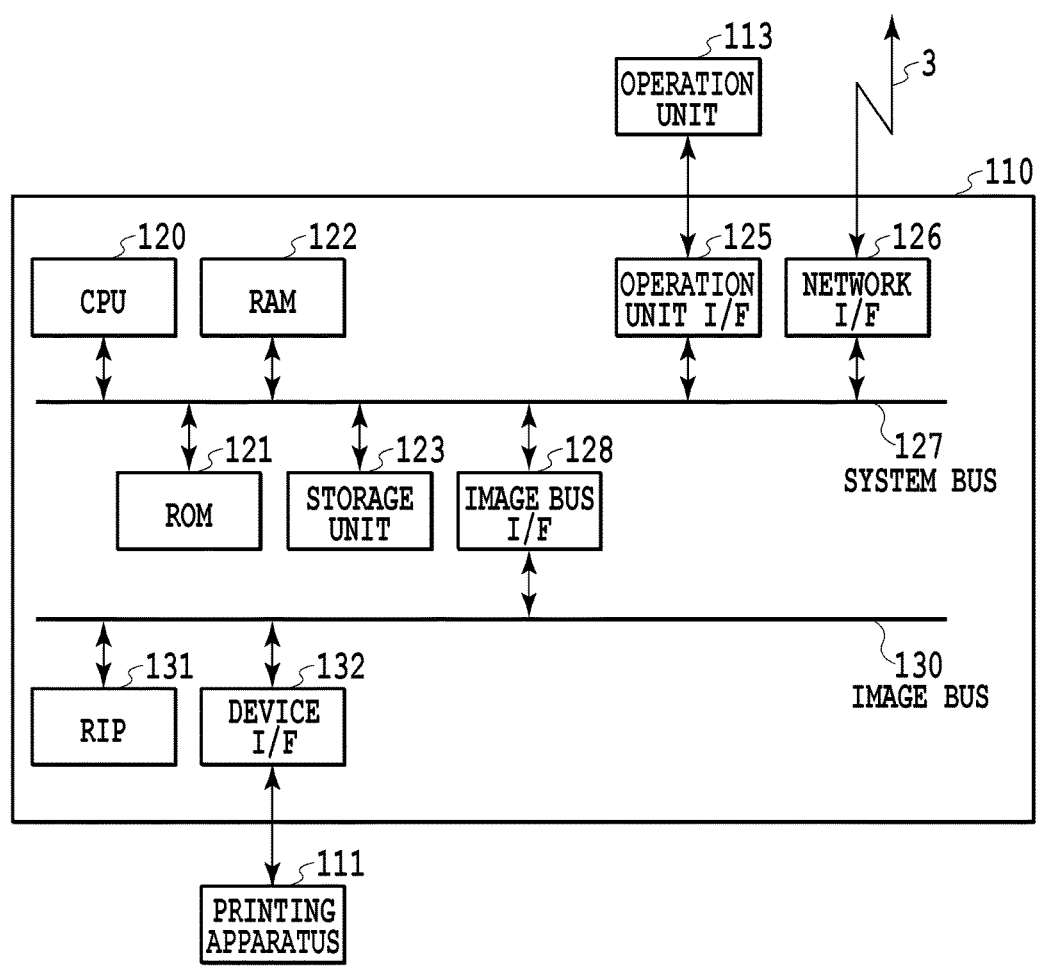
FIG. 1 is a block diagram showing a configuration example including a controller 110 of an image processing apparatus in first embodiment.

Preferable embodiments of the present invention are described below with reference to the attached drawings. Note that the configurations shown in the following embodiments are merely examples, and the present invention is not limited to the configurations illustrated in the drawings.

First Embodiment

An embodiment of the present invention is described below by using the drawings. FIG. 1 is a block diagram showing a configuration example including a controller 110 which is included in an image processing apparatus being an image formation time estimation apparatus of the embodiment. The image processing apparatus of the embodiment may be any of the printers among Multi-Function Printers (MFP) and Single-Function Printers (SFP). Alternatively, the image processing apparatus may be a printer of a printing system other than MFP or SFP.

A detailed hardware configuration of the image processing apparatus in the embodiment is described by using FIG. 1. The controller 110 of the image processing apparatus includes a CPU 120, a ROM 121, a RAM 122, and a storage unit 123. In addition, the controller 110 includes an operation unit I/F 125, a network I/F 126, a system bus 127, an image bus I/F 128, an image bus 130, a RIP 131, and a device I/F 132.

The controller 110 is connected to a printing apparatus 111 which is an image output device, and performs control for print output. Moreover, the controller 110 is connected to a LAN 3 to perform control for inputting and outputting image data and device information via the LAN 3. The printing apparatus 111 is coupled to the device I/F 132 to perform processing of outputting image data generated in the controller 110 to paper.

The CPU 120 is a central processing unit for controlling the entire image processing apparatus. The RAM 122 is a system work memory for an operation of the CPU 120 and is also an image memory for temporal storage of the inputted image data. The ROM 121 is a boot ROM and stores a boot program of a system. The storage unit 123 is a hard disk drive and stores system software for various types of processing, the inputted image data, and the like. The operation unit I/F 125 is an interface unit for an operation unit 113 which includes a display screen capable of displaying various menus, printing data information, and the like, and outputs operation screen data to the operation unit 113. Moreover, the operation unit I/F 125 has a role of sending the CPU 120 information inputted by an operator from the operation unit 113. The network I/F 126 is implemented by, for example, a LAN card or the like and is connected to the LAN 3 to input and output information to and from an external device. The units described above are disposed on the system bus 127.

The image bus I/F 128 is an interface for connecting the system bus 127 and the image bus 130 configured to transmit the image data at high speed, and is a bus bridge configured to convert a data structure. The Raster Image Processor (RIP) 131 and the device I/F 132 are connected on the image bus 130. The RIP 131 analyzes page description language (PDL) data and intermediate data (display list) and develops these data into image data. The device I/F 132 connects the printing apparatus 111 and the controller 110 to each other and performs synchronous/asynchronous conversion of the image data.

<Image Formation Time Estimation Processing in Image Processing Apparatus>

Figure 2:
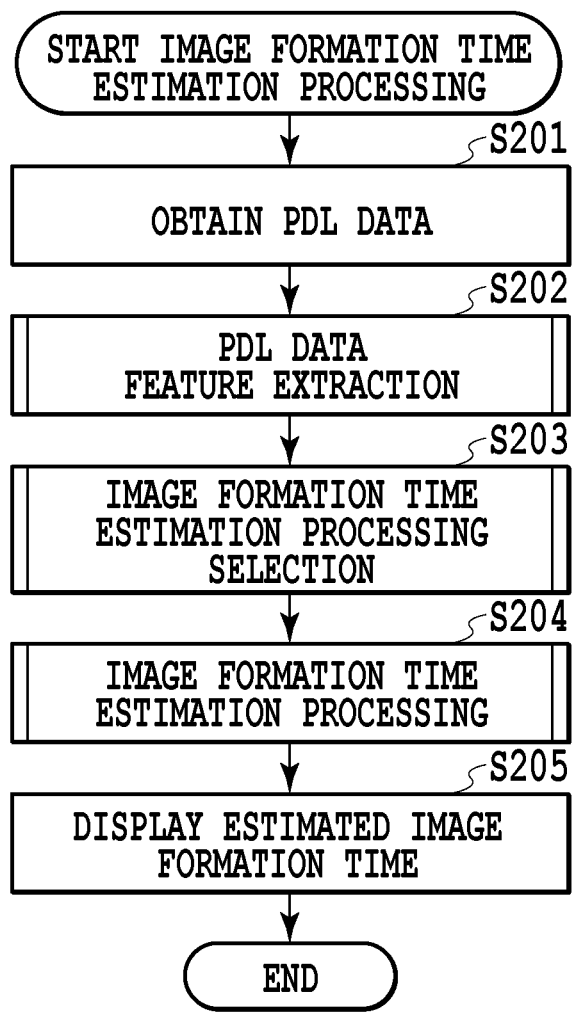
FIG. 2 is a view showing a flow of series of processes in image formation time estimation processing in first embodiment.

FIG. 2 is a view showing a flow of series of processes in the image formation time estimation processing in the embodiment. The processing shown in FIG. 2 is executed by, for example, the CPU 120. The controller 110 causes the CPU 120 to execute the processing of FIG. 2 by causing the CPU 120 to load a program for executing the processing of FIG. 2 from the ROM 121 onto the RAM 122 and execute the program.

First, printing data (hereafter, referred to as PDL data) of a page image described in PDL is transmitted from a PC to the image processing apparatus. Then, the CPU 120 stores the received PDL data in the storage unit 123. In the example of FIG. 2, the image formation time is thus estimated for each page.

First, in step S201, the CPU 120 obtains the PDL data stored in the storage unit 123. Next, in step S202, the CPU 120 performs PDL data feature extraction processing in which the features of rendering objects included in the obtained PDL data are extracted. Details will be described later. Next, in step S203, the CPU 120 selects image formation time estimation processing on the basis of the PDL data features extracted in the PDL data feature extraction processing. Details will be described later. Then, in step S204, the CPU 120 performs the image formation time estimation processing by using the image formation time estimation processing selected in the selection processing of step S203. The user can recognize the time required for the image formation by being notified of the image formation time calculated herein.

Next, in step S205, the CPU 120 performs processing of displaying the image formation time estimated in step S204. In a case where the printing data is printing data including multiple pages, the image formation time for each page may be displayed or the total image formation time for all pages may be displayed. The CPU 120 displays the image formation time on the operation unit 113 via the operation unit I/F 125 and thereby performs processing of notifying the user of the time required for the image formation processing. Note that, although description is given herein of the example in which the image formation time is displayed on the operation unit 113 of the image processing apparatus, if a printing instruction is received from a driver such as a PC, the image formation time may be displayed on the PC via the network I/F 126. Moreover, although description is given of the example in which the processes included in the image formation time estimation processing described in FIG. 2 are performed by the CPU 120, a configuration in which the processes are implemented by hardware may be employed.

<PDL Data Feature Extraction Processing in Image Processing Apparatus>

Figure 3:
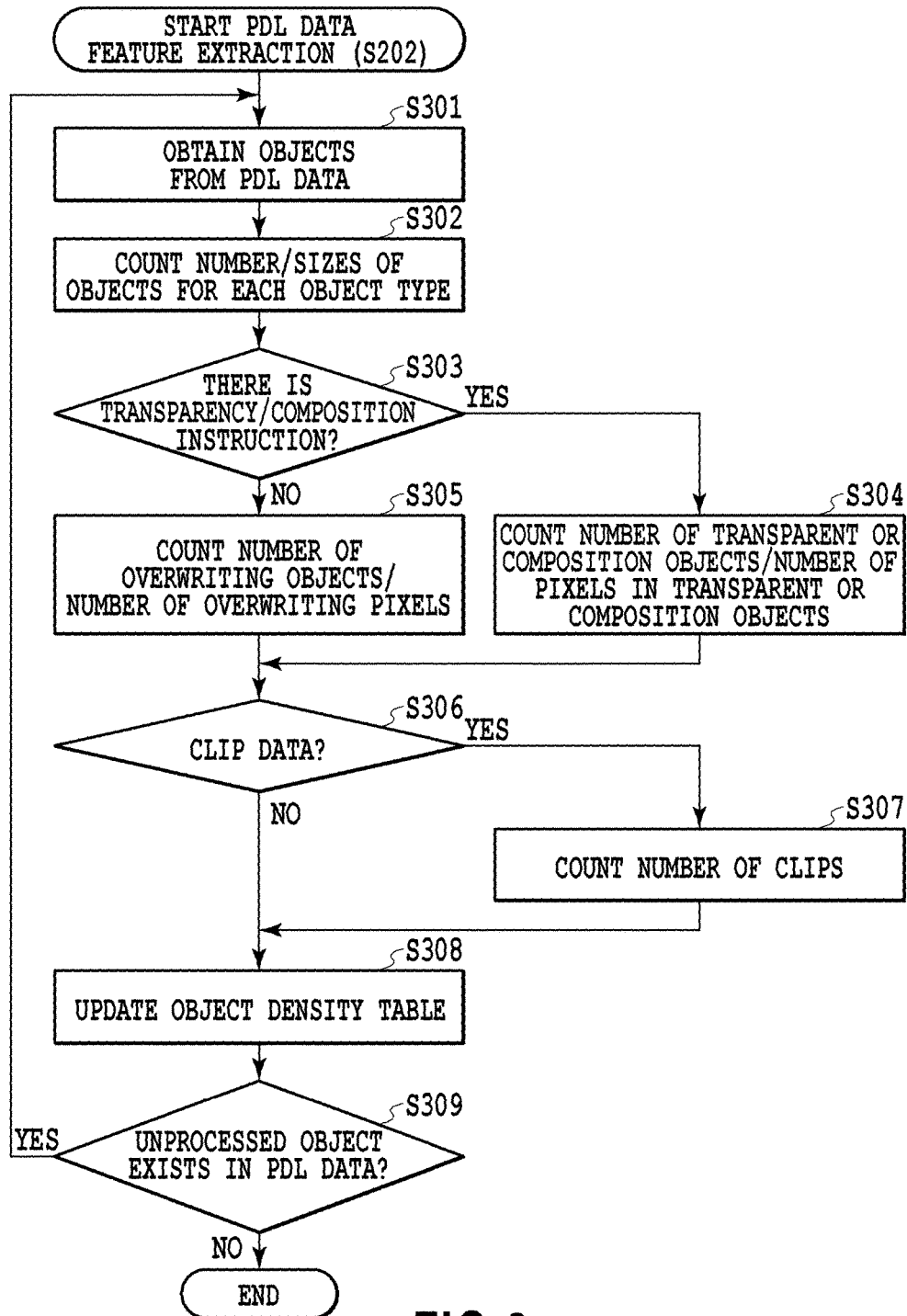
FIG. 3 is a view showing a detailed flow of PDL data feature extraction processing in first embodiment.

FIG. 3 is a view showing a detailed flow of the PDL data feature extraction processing shown in step S202 of FIG. 2 in the embodiment. The PDL data feature extraction processing is processing in which the PDL data features are extracted by analyzing the PDL data and obtaining information such as types of the rendering objects and commands which are included in the PDL data. In the following description, the rendering objects may be simply referred to as objects. The PDL data features are features such as the types and number of objects included in the PDL data and relationships among the objects. Specifically, the PDL data features are information indicating features such as the number and sizes of all objects, the number and sizes of objects for which an instruction of transparency or composition is given, the number of objects for which an instruction of clip is given, and the density of the objects. As will be described later, the image formation time estimation processing is changed depending on the PDL data features. In other words, in the embodiment, the image formation time is not simply estimated from the number and sizes of objects. Instead, appropriate image formation time estimation processing is selected in consideration of the relationships among the objects. In the processing of FIG. 3, the PDL data features which are used as criteria for performing such selection are extracted based on the PDL data. Note that FIG. 3 shows processing of extracting the features in the printing data for one page which is shown in the PDL data.

In step S301, the CPU 120 analyzes the obtained PDL data and obtains the rendering objects. Next, in step S302, the CPU 120 counts the number and sizes of objects obtained in step S301 for each object type. Graphic, image, text, and the like can be given as examples of the types of objects. For example, in a case where the type of the object obtained in step S301 is graphic, the CPU 120 increments a variable (graphic_num) indicating the number of graphics. Moreover, the CPU 120 performs processing of adding the size of the graphic obtained in step S301 to a variable (graphic_size) indicating the total value of the sizes of graphics. Note that these variables are assumed to be initialized to 0 at the start of the PDL data feature extraction processing. Variables of the following attributes are also assumed to be similarly initialized.

In a case where the type of the object obtained in step S301 is an image, the CPU 120 increments a variable (image_num) indicating the number of images. Moreover, the CPU 120 performs processing of adding the size of the image obtained in step S301 to a variable (image_size) indicating the total value of the sizes of images.

In a case where the object obtained in step S301 is a text, the CPU 120 increments a variable (font_num) indicating the number of texts. Moreover, the CPU 120 performs processing of adding the size of the text obtained in step S301 to a variable (font_size) indicating the total value of the sizes of texts.

Examples of the sizes of objects include the number of pixels in the case where the object type is an image, the number of paths and points in the case where the object type is a graphic, and the size of a text in the case where the object type is a text. Moreover, the number of object edges indicating information on an outline of the object may be used as the size of the object in this case. Furthermore, although graphic, image, and text are given as examples of types of objects herein, other types may be used.

Next, in step S303, the CPU 120 determines whether the rendering object obtained in step S301 is a rendering object for which the transparency or composition instruction is given. Whether the rendering object is a rendering object for which the transparency or composition instruction is given can be determined based on a rendering command for the rendering object. The rendering command is included in the PDL data. Note that one of instructions of transparency, composition, and overwriting is assumed to be given to each of the rendering objects. Here, the transparency and the composition are processing in which two or more objects are superimposed on each other, and are processing in which the colors of the respective objects are blended and set as the color of the rendering objects. The transparency and the composition are different from each other in a method of blending. However, since this is not essential in the embodiment, description thereof is omitted herein. The overwriting is processing in which the rendering object is displayed in the foreground. In a case where the object obtained in step S301 is a rendering object for which the transparency or composition instruction is given, the processing proceeds to step S304. In a case where the object obtained in step S301 is not a rendering object for which the transparency or composition instruction is given, the processing proceeds to step S305.

In step S304, the CPU 120 counts the number of rendering objects for which the transparency or composition instruction is given and the number of pixels in the rendering objects for which the transparency or composition instruction is given. In the count processing performed herein, the CPU 120 increments a variable (cmpst_num) indicating the number of objects for which the transparency or composition instruction is given. Furthermore, the CPU 120 performs processing of adding the size of the object, which is obtained in step S301 and for which the transparency or composition instruction is given, to a variable (cmpst_size) indicating the total value of the sizes of objects for which the transparency or composition instruction is given.

Meanwhile, in step S305, the CPU 120 counts the number of objects for which the overwriting instruction is given and the number of pixels therein. The count processing performed herein is processing of incrementing a variable (copy_num) indicating the number of overwriting objects. Moreover, the count processing is processing of adding the size of the overwriting object obtained in step S301 to a variable (copy_size) indicating the total value of the sizes of the overwriting objects. Since the CPU 120 can determine that the overwriting instruction is given in a case where no transparency or composition instruction is given in step S303, the CPU 120 performs the processing described above.

Note that the size of the transparent, composition, or overwriting rendering object is counted by converting the size of the rendering object into the number of pixels in a case where the type of rendering object is not an image.

Next in step S308, the CPU 120 determines whether the type of the rendering object obtained in step S301 is a Clip, on the basis of the rendering command for the rendering object. The rendering command is included in the PDL data. The Clip is a rendering command for clipping a rendering region. In a case where there is the rendering command of Clip, a region to be actually rendered is in the region clipped in the Clip (hereafter, referred to as in the Clip region), and objects outside the Clip region are not rendered. If the rendering time is simply estimated based on the number and sizes of objects, the estimation is made with the rendering time for objects outside the Clip region which are not rendered being included. In the embodiment, the number of Clips is thus extracted as one of the features of the PDL data. In a case where the type of the rendering object is a Clip in step S306, the processing proceeds to step S307 and the number of Clips is counted. The count processing performed herein is processing of incrementing a variable (Clip_num) indicating the number of Clips, and the processing proceeds to step S308. In a case where the type of the rendering object is not a Clip, the processing directly proceeds to step S308.

In step S308, the CPU 120 performs processing of updating an object density table managing the object density. The object density is information indicating the number of objects existing in a predetermined unit region. The number of objects in each of predetermined regions is managed by the object density table. FIG. 4 is a view showing an example of the object density table. Here, the object density table is updated by determining in which region does the rendering object obtained in step S301 exists.

Next, in step S309, the CPU 120 determines whether an unprocessed rendering object exists in the PDL data. In a case where an unprocessed rendering object exists, the processing proceeds to step S301. In a case where no unprocessed rendering object exists, the processing is terminated.

<Processing of Selecting Image Formation Time Estimation Method in the Image Processing Apparatus>

Figure 5:
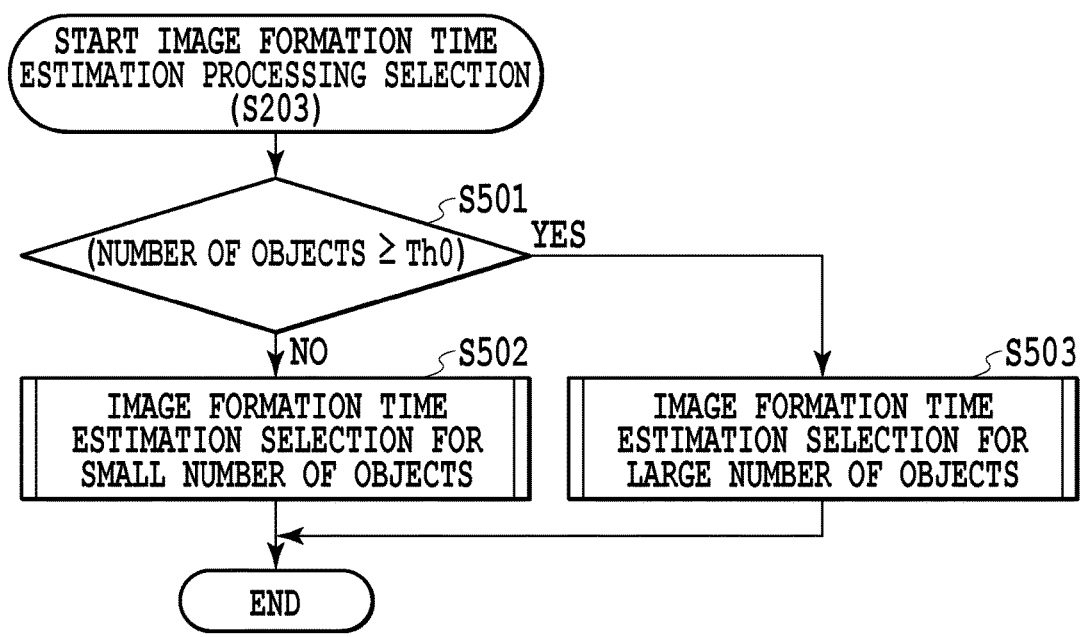
FIG. 5 is a view showing a detailed flow of image formation time estimation processing selection in first embodiment.

FIG. 5 is a view showing a detailed flow of image formation time estimation processing selection in step S203 of the FIG. 2 in the embodiment. The processing of selecting the image formation time estimation processing is performed based on the PDL data features extracted in step S202.

In step S501, the CPU 120 determines whether the number of rendering objects counted in the processing of step S202 is equal to or greater than a predetermined threshold value (Th0). The number of rendering objects is the total value of the numbers (graphic_num, image_num, font_num, and clip_num) of objects of all types counted in step S302. In a case where the number of rendering objects is smaller than the predetermined value, the processing proceeds to step S502, and the CPU 120 performs processing of selecting an image formation time estimation method for small number of rendering objects. In a case where the number of rendering objects is equal to or greater than the predetermined value, the processing proceeds to step S503, and the CPU 120 performs processing of selecting an image formation time estimation method for large number of rendering objects. Note that the determination processing may performed based on, instead of the number of objects, edge information indicating information on outlines of the objects. In such a case, the CPU 120 may determine whether the number of edges is equal to or greater than a predetermined threshold value (Th0).

<Processing of Selecting Image Formation Time Estimation Method for Small Number of Rendering Objects>

Figure 6:
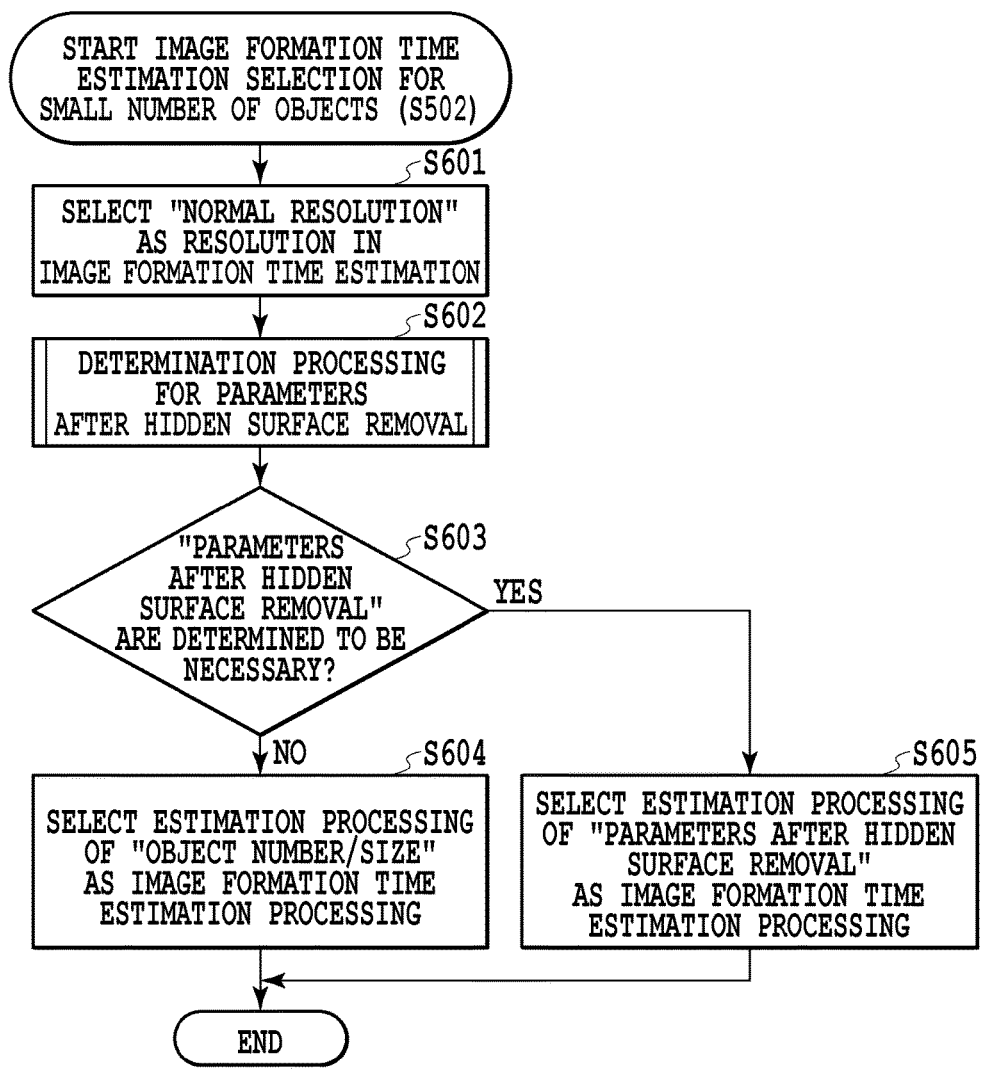
FIG. 6 is a view showing a detailed flow of processing of selecting an image formation time estimation method for small number of rendering object in first embodiment.

FIG. 6 is a view showing a detailed flow of the processing of selecting the image formation time estimation method for small number of rendering objects in step S502 of FIG. 5 in the embodiment.

In step S601, the CPU 120 performs processing of determining a resolution of intermediate data used in the image formation time estimation processing. Since the processing in this flow is processing for small number rendering objects, the time required for the image formation time estimation is considered to be not long. Accordingly, the CPU 120 selects a normal resolution which is a resolution at the time of a printing instruction.

Next, in step S602, the CPU 120 performs determination processing for parameters after the hidden surface removal which is processing of determining whether the parameters after hidden surface removal are necessary as parameters to be used in the image formation time estimation processing. Details will be described later. In a case where the CPU 120 determines that the parameters after the hidden surface removal are unnecessary as the result of the processing in step S602, in step S603, the CPU 120 causes the processing to proceed to step S604. In a case where the CPU 120 determines that the parameters after the hidden surface removal are necessary, the CPU 120 proceeds to step S605. In the case where the CPU 120 determines that the parameters after the hidden surface removal are unnecessary, in step S604, the CPU 120 selects estimation processing of "object number/size" as the method of the image formation time estimation processing. The estimation processing of "object number/size" is processing of calculating the image formation time by performing operations using the number and sizes of objects and coefficients, and is a method disclosed in, for example, Japanese Patent Laid-Open No. 2011-239071. Meanwhile, in the case where the CPU 120 determines that the parameters after the hidden surface removal are necessary, in step S605, the CPU 120 selects estimation processing of "parameters after the hidden surface removal" as the method of the image formation time estimation processing. The estimation processing of "parameters after the hidden surface removal" is processing of calculating the image formation time by performing operations using various parameters after the hidden surface removal and coefficients.

<Determination Processing for Parameters after Hidden Surface Removal in Image Processing Apparatus>

Figure 7:
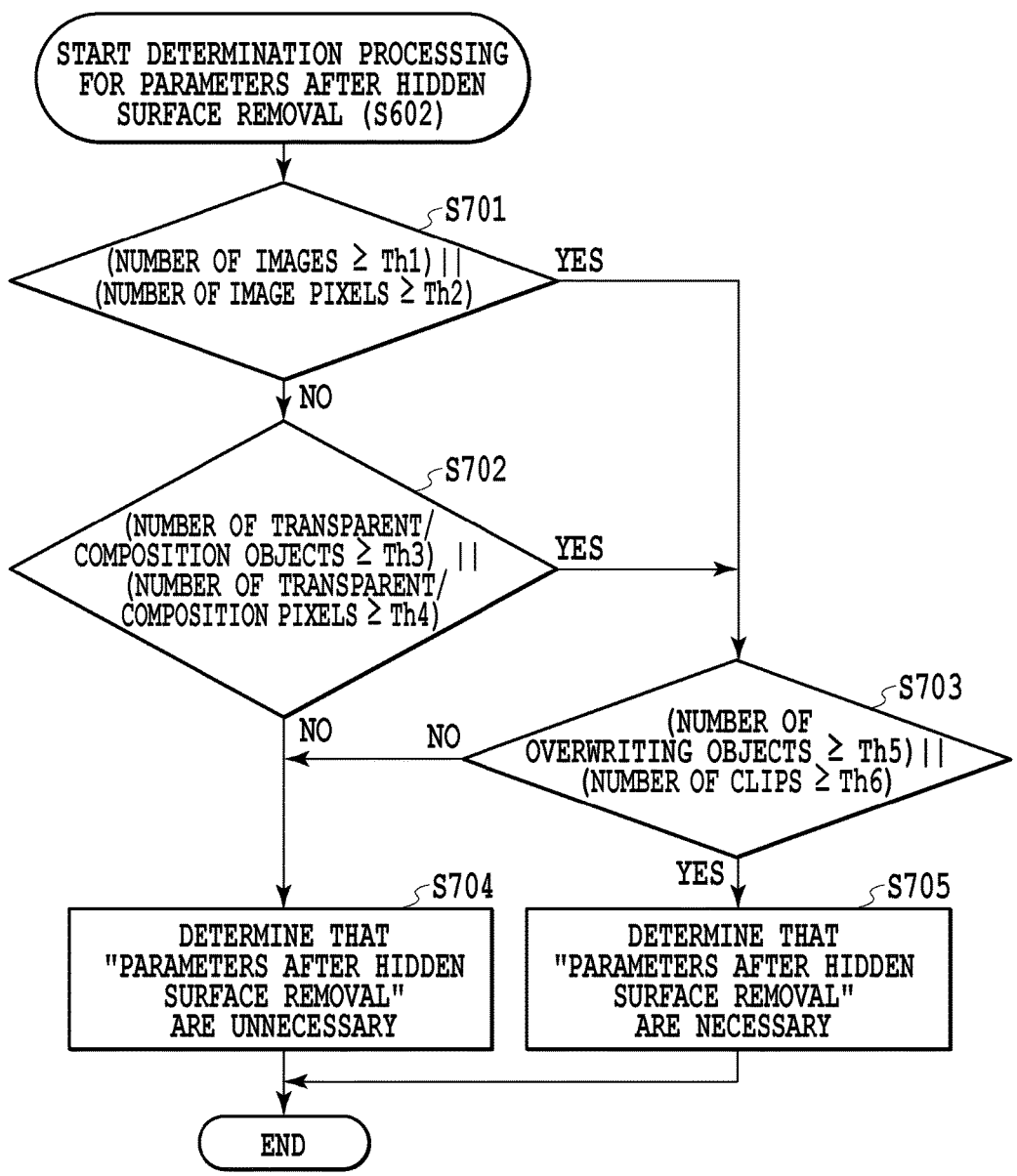
FIG. 7 is a view showing a detailed flow of determination processing for parameters after hidden surface removal in first embodiment.

FIG. 7 is a view showing a detailed flow of determination processing for the parameters after the hidden surface removal in step S602 of FIG. 6 in the embodiment. In the determination processing for the parameters after the hidden surface removal, processing is performed based on the PDL data features extracted in the processing of step S202.

In step S701, the CPU 120 determines whether at least one of the number of the image-type objects and the number of pixels in the image-type objects which are counted in step S202 is equal to or greater than a predetermined threshold value corresponding thereto. Specifically, the CPU 120 determines whether at least one of image_num and image_size is equal to or greater than a corresponding one of threshold values (Th1, Th2). In a case where both numbers are less than the threshold values, the processing proceeds to step S702. In a case where at least one of the numbers is equal to or greater than the corresponding threshold value, the processing proceeds to step S703. In the image-type objects, since processing of rendering pixels one by one is performed, the processing amount is great. It is assumed that, as the number or size of such image-type objects becomes greater, the time required to render the rendering object after the hidden surface removal may vary at a greater degree. Accordingly, in a case where the number or size of image-type objects is equal to or greater than the predetermined threshold value, the processing proceeds to step S703 which is a course of processing in which the "parameters after the hidden surface removal" are necessary.

In step S702, the CPU 120 determines whether at least one of the number of rendering objects, which is counted in step S302 and for which the transparency or composition instruction is given, and the number of pixels therein is equal to or greater than a predetermined threshold value corresponding thereto. Specifically, the CPU 120 determines whether at least one of cmpst_num and cmpst_size is greater than a corresponding one of threshold values Th3, Th4.

In a case where both numbers are smaller than the threshold values, the processing proceeds to step S704. In a case where at least one of the numbers is equal to or greater than the corresponding threshold value, the processing proceeds to step S703. In the rendering objects for which the transparency or composition instruction is given, at least portions of the objects overlap each other on a scan line. Accordingly, it is assumed that the time required to render the rendering object after the hidden surface removal may vary greatly. Hence, in a case where the number of rendering objects for which the transparency or composition instruction is given or the size of this rendering objects is equal to or greater than the predetermined threshold value, the processing proceeds to step S703 which is a course of processing in which the "parameters after the hidden surface removal" are necessary.

In step S703, the CPU 120 determines whether at least one of the number of overwriting objects and the number of Clips which are counted in step S302 is equal to or greater than a predetermined threshold value corresponding thereto. Specifically, the CPU 120 determines whether the at least one of copy_num and clip_num is equal to or greater than a corresponding one of threshold values Th5, Th6. In a case where both numbers are smaller than the threshold values, the processing proceeds to step S704. In a case where at least one of the numbers is equal to or greater than the corresponding threshold value, the processing proceeds to step S705. In a case where the number of overwriting objects and the number of Clips are both smaller than the predetermined thresholds, effects due to the hidden surface removal is considered to be small. Accordingly, even if the determination result is "YES" in step S701 or the step S702, the processing proceeds to step S704 depending on the determination result of step S703, and the CPU 120 determines that the "parameters after the hidden surface removal" are unnecessary. Note that it is only necessary to perform the processing of step S703 as needed, and processing of step S703 may be omitted.

In step S704, the CPU 120 performs processing of determining that the parameters after the hidden surface removal are unnecessary in the image formation time estimation processing. Meanwhile, in step S705, the CPU 120 performs processing of determines that the parameters after the hidden surface removal are necessary in the image formation time estimation processing.

<Processing of Selecting Image Formation Time Estimation Method for Large Number of Rendering Objects>

Figure 8:
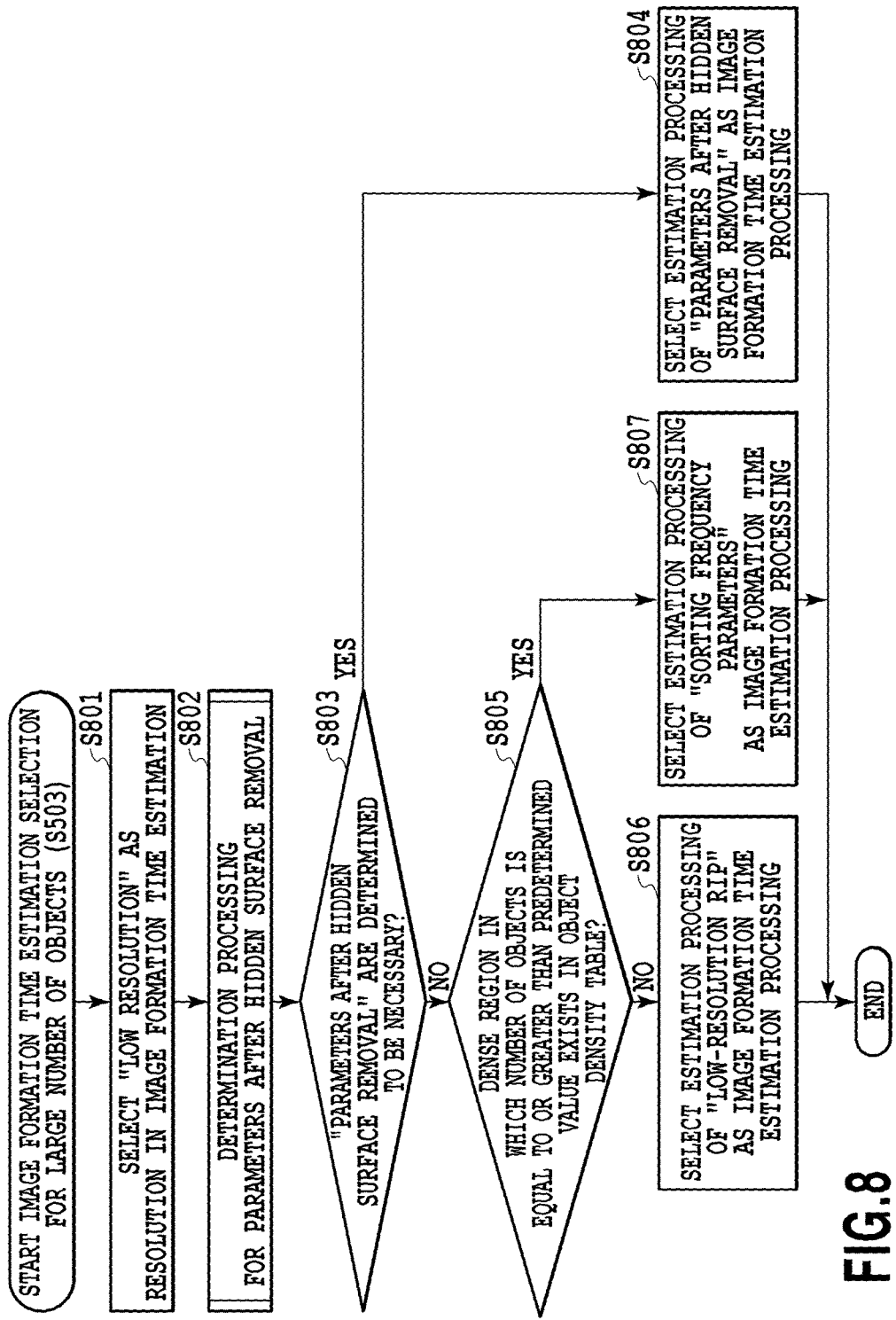
FIG. 8 is a view showing a detailed flow of processing of selecting the image formation time estimation method for large number of rendering objects in first embodiment.

FIG. 8 is a view showing a detailed flow of processing of selecting the image formation time estimation method for large number of rendering objects in step S503 of FIG. 5 in the embodiment.

In step S801, the CPU 120 performs processing of determining which resolution of intermediate data generated is to be used in the processing of obtaining the parameters for the image formation time estimation processing. Specifically, the CPU 120 selects a low resolution which is lower than the resolution designated in the printing instruction. The selected resolution is, for example, 72 dpi, 144 dpi, 200 dpi, or 300 dpi. This processing is performed to simplify the processing of obtaining the parameters because, if there are a large number of objects, the CPU 120 may be slow in completing the processing of obtaining the parameters for estimating the image formation time in the normal resolution.

In step S802, the CPU 120 performs determination processing for the parameters after the hidden surface removal in which the CPU 120 determines whether the parameters after the hidden surface removal are necessary as the parameters to be used in the image formation time estimation processing. Since the processing of step S802 is the same as the processing of step S602, description herein is omitted.

In a case where the CPU 120 determines that the parameters after the hidden surface removal are unnecessary as a result of step S802, in step S803, the CPU 120 causes the processing to proceed to step S805. Meanwhile, in a case where the CPU 120 determines that the parameters after the hidden surface removal are necessary, the CPU 120 selects the estimation processing of "parameters after the hidden surface removal" as the method of image formation time estimation processing as in step S605.

In step S805, the CPU 120 determines whether a region in which the number of existing objects is equal to or greater than a predetermined threshold value defined in advance exists in the object density table. For example, in a case where the threshold value is three, the CPU 120 determines that the region exists in the example of FIG. 4 because the number of objects is equal to or greater than the threshold value in the rectangular region (X, Y) (500, 0), (500, 500). In a case where the CPU 120 determines that the region exists, the processing proceeds to step S807, and estimation processing of "sorting frequency parameters" is selected as the method of the image formation time estimation processing. The estimation processing of "sorting frequency parameters" is an estimation method in which the image formation time is calculated by: calculating sorting frequency parameters indicating the numbers of times of search processing of portions where the objects are inserted; and then performing an operation using the calculated value and a coefficient. Details will be described later. Meanwhile, in a case where the CPU 120 determines that no region in which the number of existing objects is equal to or greater than the predetermined threshold value defined in advance exists in the object density table, estimation processing of "low-resolution RIP" is selected as the method of the image formation time estimation processing. The estimation processing of "low-resolution RIP" is processing of calculating the image formation time by actually performing the image formation processing on low-resolution intermediate data and performing an operation using an actually-measured time of the image formation processing and a predetermined coefficient.

<Image Formation Time Estimation Processing in Image Processing Apparatus>

Figure 9:
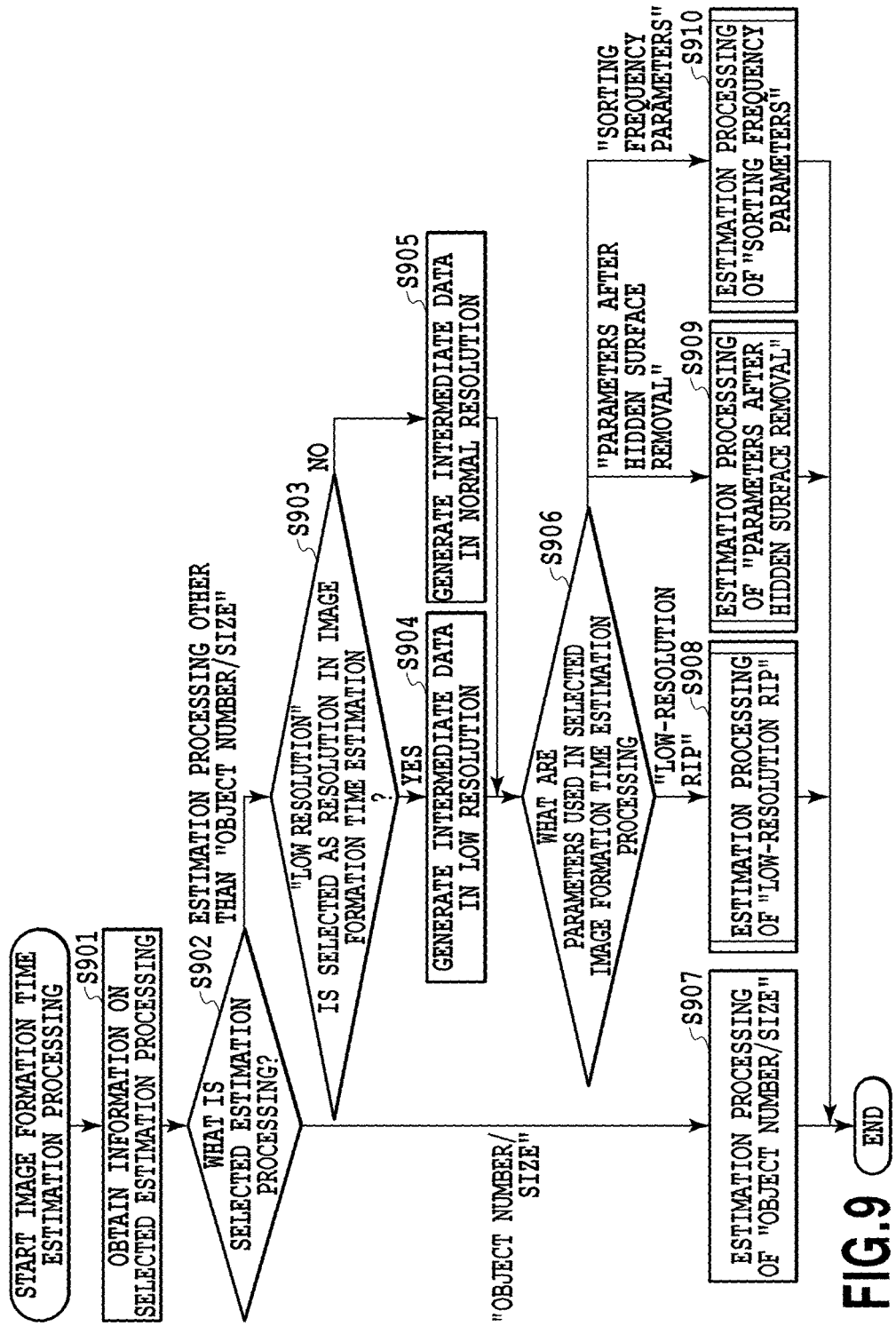
FIG. 9 is a view showing a detailed flow of the image formation time estimation processing in first embodiment.

FIG. 9 is a view showing a detailed flow of the image formation time estimation processing in step S204 of FIG. 2 in the embodiment.

In step S901, the CPU 120 obtains information indicating the image formation time estimation processing selected in step S203. Next, in step S902, the CPU 120 performs processing of determining whether the selected image formation time estimation processing is the estimation processing of "object number/size". In a case where the selected image formation time estimation processing is the estimation processing of "object number/size", the processing proceeds to step S907. In a case where the selected image formation time estimation processing is not the estimation processing of "object number/size", the processing proceeds to step S903.

In step S903, the CPU 120 performs processing of determining the resolution specified in step S601 or step S801. In a case where the "low resolution" is set, the processing proceeds to step S904, and the CPU 120 generates low-resolution intermediate data as intermediate data used for the image formation time estimation processing. The low-resolution intermediate data is generated herein for the following reason. In a case where the number of objects or the number of edges is great, a long time is required for the processing of obtaining the parameters necessary for the image formation time estimation processing. Therefore, the parameters are obtained in the low resolution to perform the estimation processing at a higher speed. The obtained parameters are converted to values of parameters in the normal resolution by using a coefficient of a resolution ratio, and the estimation processing is performed based on the converted values. For example, the coefficient of resolution ratio is a coefficient of three times in a case where the printing is instructed in 600 dpi and the estimation processing is performed in the low resolution of 200 dpi. Meanwhile, in a case where the "normal resolution" is set, the processing proceeds to step S905, and intermediate data having the same resolution as that in the printing instruction is generated as the intermediate data from which the parameters used for the image formation time estimation processing are obtained.

Next, in step S906, the CPU 120 performs determination processing for the parameters obtained in step S901. In the case of "low-resolution RIP", the processing proceeds to step S908. In the case of "parameters after the hidden surface removal", the processing proceeds to step S909. In the case of "sorting frequency parameters", the processing proceeds to step S910.

In step S907, the CPU 120 performs the image formation time estimation processing based on the "object number/size". Specifically, for example, the estimation method is to calculate the image formation time by performing operations using the number of objects of each type, the sizes thereof and coefficients corresponding thereto as shown below. Such processing can be performed by using a publicly-known method like one described in, for example, Japanese Patent Laid-Open No. 2011-239071.

<<Estimation Processing of "Object Number/Size">>

Image Formation Time=(Number of Graphics×Coefficient 1)+(Number of Images×Coefficient 2)+(Number of Texts×Coefficient 3)+(Number of Graphic Points×Coefficient 4)+(Sizes of Images×Coefficient 5)+(Sizes of Texts×Coefficient 6)

In step S908, the CPU 120 performs image formation time estimation processing on the basis of the "low-resolution RIP". This estimation processing is also assumed to be performed by using a publicly-known technique. In detail, the estimation method is such processing that the image formation processing is actually performed and the actually-measured value of the image formation processing is recognized as the image formation time. However, in a case where the image formation processing is performed in the normal resolution, the processing sometimes takes a long time. Accordingly, the processing of calculating the image formation time is performed by: actually performing the image formation processing on the basis of the intermediate data generated in the low resolution; and performing an operation using the actual image formation time and the coefficient of the ratio between the normal resolution and the low resolution.

In step S909, the CPU 120 performs the image formation time estimation processing on the basis of the "parameters after the hidden surface removal". Here, the image formation time estimation is performed based on rendering information after removal of information on a portion which is actually hidden and not rendered due to overlapping of another object in the foreground. Details will be described later.

In step S910, the CPU 120 performs the image formation time estimation processing on the basis of the "sorting frequency parameters". In this case, order control processing (sorting processing) of objects in the image formation processing is actually performed to calculate the number of times of sorting processing performed in the order control processing, and the image formation time estimation processing is performed based on the calculated number of times of sorting. Details will be described later.

<Estimation Processing of "Parameters after Hidden Surface Removal" in Image Processing Apparatus>

Figure 10:
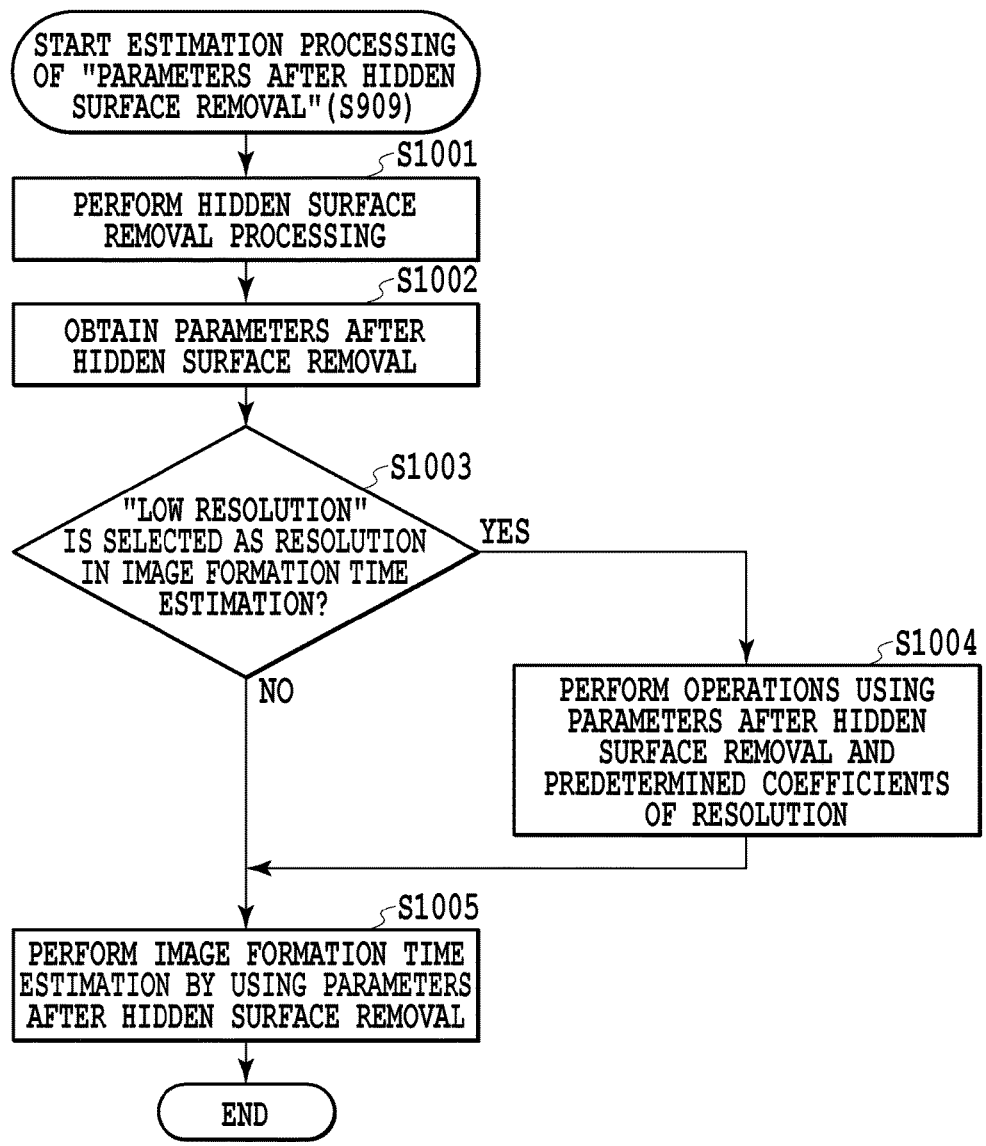
FIG. 10 is a view showing a detailed flow of estimation processing of "parameters after hidden surface removal" in first embodiment.

FIG. 10 is a view showing a detailed flow of the estimation processing of "parameters after the hidden surface removal" in step S909 of FIG. 9 in the embodiment. Moreover, FIGS. 11 and 12 are views for explaining hidden surface removal processing performed in the estimation processing of "parameters after the hidden surface removal" and the parameters after the hidden surface removal. The estimation processing of "parameters after the hidden surface removal" is processing of estimating the image formation processing time in consideration of the hidden surface removal. Specifically, the image formation processing time is estimated by using the parameters after the hidden surface removal.

In step S1001, the CPU 120 performs the hidden surface removal processing on the intermediate data generated in step S904 or S905. The hidden surface removal processing performed herein uses a publicly-known technique. FIG. 11 shows a page image 1101. The page image 1101 is a page in which a clip rendering region 1102 and a rectangular rendering region 1103 overlap each other. Note that a dotted line in the page image 1101 shows an image object before the clip which has a rectangular shape. The clip rendering region 1102 is a region obtained by clipping the image object having the rectangular shape shown by the dotted line in a triangular shape indicated in a clip instruction. A portion of the image outside the cutting-out region is not rendered, and a portion of the image inside the cutting-out region is rendered. Moreover, in the page image 1101, the rectangular rendering region 1103 is placed in the foreground of the clip rendering region 1102 and partially overlaps (is written over) the clip rendering region 1102.

Description is given of the hidden surface removal processing in the page image 1101 including such objects. First, there is extracted the clip rendering region 1102 obtained by clipping the image data, having the rectangular shape shown by the aforementioned dotted line, in triangular clip rendering. Next, a portion of the clip rendering region 1102 which is hidden by the rectangular rendering region 1103 is deleted. Portions not rendered by being clipped off or hidden are thereby deleted, and there is generated closed region information in which only the portions to be rendered are extracted for each scan line. FIG. 11 also shows closed region information 1120 of the clip rendering region 1102 after the hidden surface removal and closed region information 1130 of the rectangular rendering region 1103 after the hidden surface removal. Page information 1110 after the hidden surface removal is formed of such closed region information 1120, 1130 after the hidden surface removal and a closed region of a blank portion. The parameters after the hidden surface removal refer to the number of closed regions, the number of objects, the number of pixels, and the like which are shown in such closed region information.

FIG. 12 is a view showing an example of the hidden surface removal processing for an object for which the transparency instruction is given. FIG. 12 shows an example in which a clip rendering region and a rectangular rendering region overlap each other as in FIG. 11, but is a view showing an example in which this rectangular rendering region is transparent. In the hidden surface removal processing in a page image 1201 shown in FIG. 12, the clip rendering region obtained by clipping image data, having a rectangular shape shown by a dotted line, in a triangular shape is first extracted as in the description of FIG. 11. Next, a transparent overlapping region 1204 in which the clip rendering region 1202 and the transparent rectangular rendering region 1203 overlap each other is extracted. Moreover, a transparent overlapping region 1205 in which the transparent rectangular rendering region 1203 overlaps a blank portion is extracted. A portion hidden by the clip and not rendered is thereby deleted, and there is generated closed region information in which portions taking in consideration of the transparent portions are extracted for each scan line. FIG. 12 also shows closed region information 1220 of the clip rendering region 1202 after the hidden surface removal, closed region information 1230 of the transparent overlapping region 1204 after the hidden surface removal, and closed region information 1240 of the transparent overlapping region 1205 after the hidden surface removal. Page information 1210 after the hidden surface removal is formed of such closed region information 1220, 1230, 1240 after the hidden surface removal and a closed region of a blank portion.

That is the description of the hidden surface removal processing and the parameters after the hidden surface removal. Next, let us return to the flowchart of FIG. 10 to continue the description of the estimation processing of "parameters after the hidden surface removal".

In step S1002, the CPU 120 performs processing of obtaining the parameters after the hidden surface removal. The parameters after the hidden surface removal obtained herein refer to the total number of closed regions of rendering targets in the page, the total number of objects, and the total number of pixels which are shown in the closed region information (1120, 1130, 1220, 1230, 1240) calculated in the aforementioned hidden surface removal processing. For example, in the page image 1101 shown in FIG. 11, the total number of closed regions is nine, the total number of objects is nine, and the total number of closed region pixels is 48. Meanwhile, in the page image 1201 shown in FIG. 12, the total number of closed regions is 11, the total number of objects is 13, and the total number of closed region pixels is 51. Note that, since two objects of the clip rendering region 1202 and the transparent rectangular rendering region 1203 overlap each other in the transparent overlapping region 1204 in FIG. 12, the number of objects is two.

In step S1003, the CPU 120 performs processing of determining the resolution specified in step S601 or step S801. In the case where the "low resolution" is set, the processing proceeds to step S1004. In the case where the "normal resolution" is set, the processing proceeds to step S1005.

In step S1004, the CPU 120 performs processing of performing operations using the parameters after the hidden surface removal obtained in step S1002 and predetermined coefficients of the resolution ratio. In a case where the processing proceeds to step S1004, the parameters after the hidden surface removal obtained in step S1002 are values calculated based on the intermediate data generated in the low resolution. Accordingly, the values close to the parameters after the hidden surface removal in the normal resolution are calculated by performing the operations using the parameters after the hidden surface removal obtained in step S1002 and the predetermined coefficients, so as to calculate the image formation time in the normal resolution.

In step S1005, the CPU 120 actually performs the image formation time estimation processing by using the parameters after the hidden surface removal obtained in step S1002 or calculated in step S1004. Examples of the method of image formation time estimation processing include a method in which operations are performed using the obtained parameters after the hidden surface removal and predetermined coefficients and the sum of resultant values of the operations is calculated as the image formation time. In practice, the processing of calculating the image formation time is performed by using, for example, the following operation expression.

<<Estimation Processing of "Parameters after Hidden Surface Removal">>

> Image Formation Time=(Total Number of Closed Regions×Coefficient 11)+(Total Number of Closed Region Objects×Coefficient 12)+(Total Number of Closed Region Pixels×Coefficient 13)+(Total Number of Objects or Total Number of Edges×Coefficient 14)

The total number of closed regions, the total number of closed region objects, and the total number of closed region pixels herein are those shown in FIGS. 11 and 12. These numbers are multiplied respectively by predetermined coefficients and then added up, and a number obtained by multiplying the total number of objects or the total number of edges by a predetermined coefficient is added to the added-up number. The number obtained by multiplying the total number of objects or the total number of edges by the predetermined coefficient is added because the time required for the hidden surface removal is put into consideration. Specifically, the image formation time includes the time required for the processing of rendering performed by using the parameters after the hidden surface removal and the time required to calculate the parameters after the hidden surface removal. The time required to calculate the parameters after the hidden surface removal can be roughly obtained by multiplying the total number of objects or the total number of edges by the predetermined coefficient.

<Modified Example of Estimation Processing of "Parameters after Hidden Surface Removal">

Next, a modified example of the estimation processing of "parameters after the hidden surface removal" is described. Specifically, in the processing of FIG. 10, the processing of step S1002, step S1004, and step S1005 is modified.

In the modified example, in step S1002, a hidden surface removal time taken for the hidden surface removal processing performed in step S1001 is obtained together with the parameters after the hidden surface removal. Moreover, in step S1004, the CPU 120 performs processing of performing operations using the parameters after the hidden surface removal obtained in step S1002 and the predetermined coefficients of the resolution ratio and also performing an operation using the hidden surface removal time obtained in step S1002 and a predetermined coefficient of the resolution ratio.

Then, in step S1005, the CPU 120 actually performs image formation time estimation processing by using the calculated parameters after the hidden surface removal and hidden surface removal time. The calculation method is such that operations are performed using the obtained parameters after the hidden surface removal, the hidden surface removal time, and predetermined coefficients and the sum of resultant values of the operations is calculated as the image formation time. In practice, the processing of calculating the image formation time is performed by using, for example, the following operation expression.

<<Estimation Processing of "Parameters after Hidden Surface Removal">>

> Image Formation Time=(Total Number of Closed Regions×Coefficient 11)+(Total Number of Closed Region Objects×Coefficient 12)+(Total Number of Closed Region Pixels×Coefficient 13)+(Hidden Surface Removal Time×Coefficient 15)

This modified example is different from the aforementioned example in that the image formation time is estimated by using the time actually taken for the hidden surface removal processing, instead of obtaining the time taken for the hidden surface removal by multiplying the total number of objects or the total number of edges by the predetermined coefficient.

<Estimation Processing of "Sorting Frequency Parameters" in Image Processing Apparatus>

Figure 13:
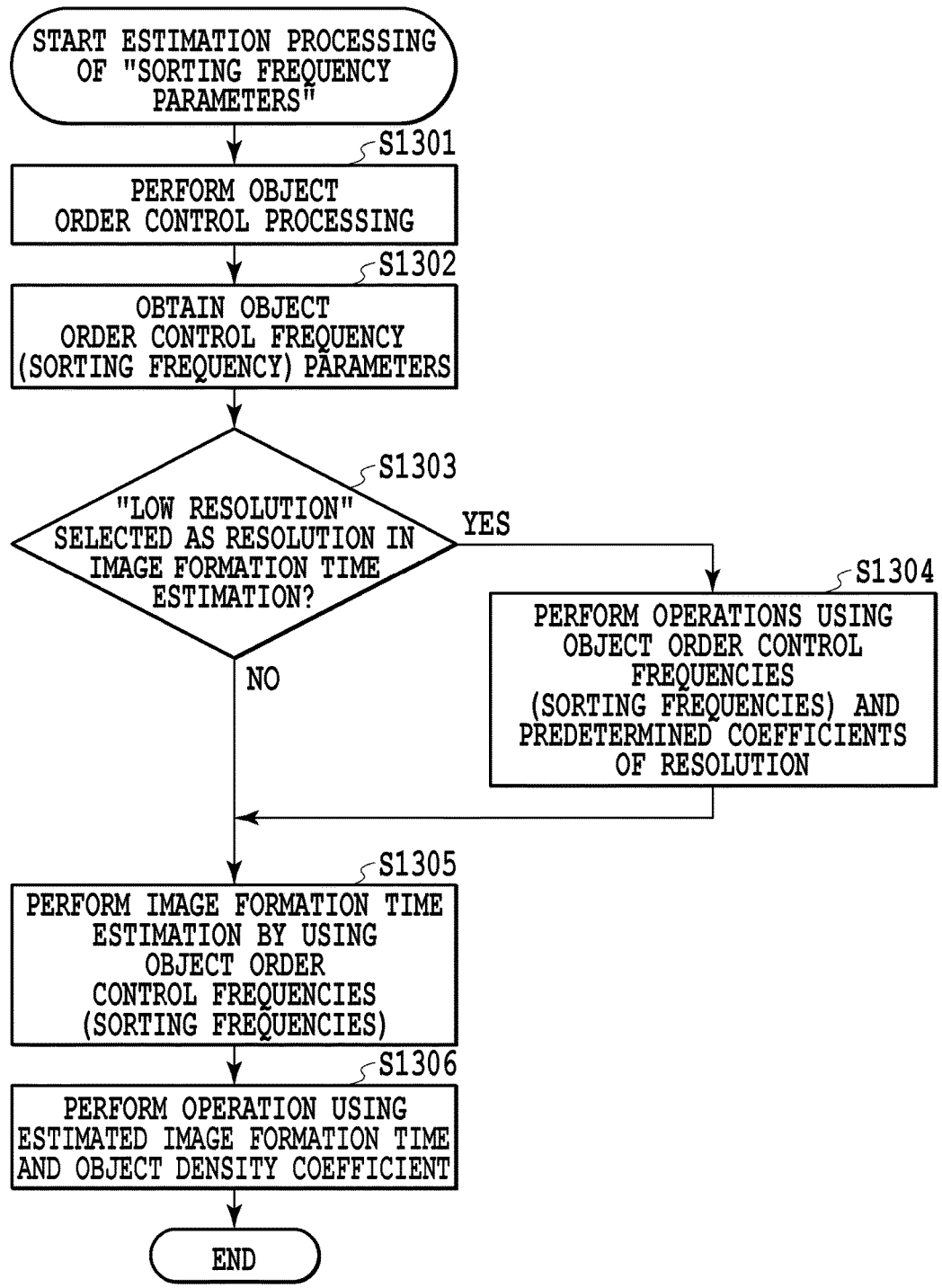
FIG. 13 is a view showing a detailed flow of estimation processing of "sorting frequency parameters" in first embodiment.

FIG. 13 is a view showing a detailed flow of the estimation processing of "sorting frequency parameters" in step S910 of FIG. 9 in the embodiment. Moreover, FIG. 14 is a view for explaining sorting frequency calculation processing performed in the estimation processing of "sorting frequency parameters" and the sorting frequency parameters.

In step S1301, the CPU 120 first performs object order control processing on the intermediate data generated in step S904 or S905. The object order control processing performed herein uses a publicly-known technique.

Figure 14:
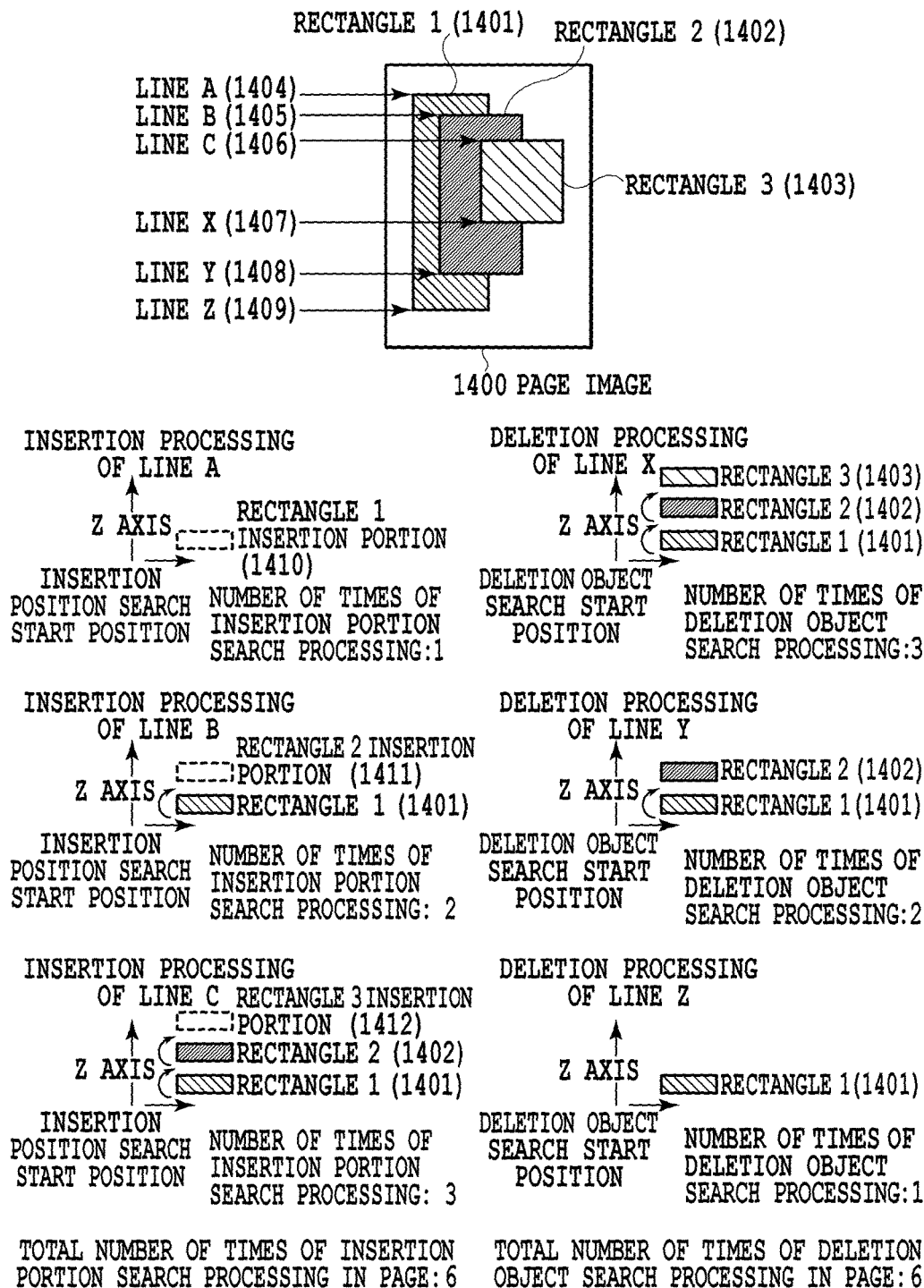
FIG. 14 is a view for explaining detailed contents of the estimation processing of "sorting frequency parameters" in first embodiment.

FIG. 14 is a view showing a specific example of the object order control processing. The object order control processing is processing of sorting an arrangement order of objects in a case of performing rendering processing in a scan line. The example of FIG. 14 shows processing of searching positions where rectangles are inserted and deleted in a depth direction (z-axis direction). In a case where there are many objects in a specific region, the processing of searching the positions where rectangles are inserted and deleted is performed many times in the object order control processing. The processing of searching the positions where rectangles are inserted and deleted is processing which takes time. In a case where the object order control processing is performed many times, the image formation processing time simply estimated from the number and sizes of objects greatly deviates from the actual image formation processing time even if no parameters after the hidden surface removal are used. In view of this, in the case where the object order control processing is performed many times, the image formation processing time is estimated in processing like one shown in FIG. 14, even if the number of objects of composition and the like is equal to or smaller than the predetermined threshold value and no parameters after the hidden surface removal are used. Note that, in the processing using the parameters after the hidden surface removal shown in the aforementioned example, the time for the object order control processing is included as the time required for the hidden surface removal.

The object order control processing is described by using the example of FIG. 14. For example, in the object order control processing of a page in which three rectangles (1401, 1402, 1403) overlap one another as in a page image 1400, processing is performed for a line in which each of the rectangles first appears and on a line from which the rectangle disappears. First, in a case where the page image 1400 is processed, a rectangle 1 appears in a line A (1404). Insertion processing in the line A shown in FIG. 14 is thus performed. At this time, the number of times of insertion portion search processing is one as shown in FIG. 14. Then, a rectangle 2 appears in a line B (1405). Insertion processing in the line B shown in FIG. 14 is thus performed. At this time, the number of times of insertion portion search processing is two as shown in FIG. 14. Next, a rectangle 3 appears in a line C (1406). Insertion processing in the line C shown in FIG. 14 is thus performed. At this time, the number of times of insertion portion search processing is three as shown in FIG. 14.

Then, the rectangle 3 disappears in a line X (1407). Deletion processing in the line X shown in FIG. 14 is thus performed. At this time, the number of times of deletion object search processing is three as shown in FIG. 14. Next, the rectangle 2 disappears in a line Y (1408). Deletion processing in the line Y shown in FIG. 14 is thus performed. At this time, the number of times of deletion object search processing is two as shown in FIG. 14. Then, the rectangle 1 disappears in a line Z (1409). Deletion processing in the line Z shown in FIG. 14 is thus performed. At this time, the number of times of deletion object search processing is one as shown in FIG. 14. Processing of calculating the number of times of insertion or deletion is performed in the appearance or disappearance lines of the objects as described above.

Next, let us return to the flowchart of FIG. 13 to continue the description. In step S1302, the CPU 120 performs processing of obtaining object order control frequency (sorting frequency) parameters. Examples of the object order control frequency (sorting frequency) parameters obtained herein include the number of times of insertion portion search processing and the number of times of deletion object search processing which are calculated in the aforementioned object order control processing in step S1301. In the case of the page image 1400, the number of times of insertion portion search processing is six and the number of times of deletion object search processing is six.

In step S1303, the CPU 120 performs processing of determining the resolution specified in step S601 or S801. In a case where the "low resolution" is set, the processing proceeds to step S1304. In a case where the "normal resolution" is set, the processing proceeds to step S1305.

In step S1304, the CPU 120 performs processing of performing operations using the object order control frequencies (sorting frequencies) obtained in steps S1302 and predetermined coefficients of the resolution ratio. In a case where the processing proceeds to step S1304, the object order control frequencies (sorting frequencies) obtained in step S1302 are values calculated based on the intermediate data generated in the low resolution. Since the image formation time is desired to be calculated in the normal resolution, there is performed processing in which the values close to the object order control frequencies (sorting frequencies) in the normal resolution are calculated by performing operations using the object order control frequencies (sorting frequencies) obtained in step S1302 and the predetermined coefficients. In a case where the conversion to the low resolution is performed, there may be a case where objects become too small and objects which would be sorted in the normal resolution are not actually sorted. In consideration of this point, in step S1304, there is used data obtained by performing an operation using the intermediate data generated in the low resolution and the predetermined coefficients.

In step S1305, the CPU 120 actually performs image formation time estimation processing by using the calculated object order control frequencies (sorting frequencies). In the estimation method, operations are performed using the obtained number of times of insertion portion search processing, the number of times of deletion object search processing, and predetermined coefficients, and the sum of resultant values of the operations is calculated as the image formation time. In practice, the processing of calculating the image formation time is performed by using, for example, the following operation expression.

<<Estimation Processing of "Sorting Frequency Parameter">>

Image Formation Time=(Number of Times of Insertion Portion Search Processing×Coefficient 21)+(Number of Times of Deletion Object Search Processing×Coefficient 22)+(Total Number of Objects or Total Number of Edges×Coefficient 23)

In this expression, the image formation time includes a value obtained by performing an operation using the total number of objects or the total number of edges and the predetermined coefficient, in consideration of the time for rendering the objects after the sorting processing.

Next, in step S1306, the CPU 120 performs an operation using the image formation time estimated in step S1305 and an object density coefficient. In the object order control processing, cache efficiency and the like tend to deteriorate as the sorting frequency increases. In view of this, step S1306 shows processing of calculating some overhead in such a case. As shown in FIG. 4, the density of objects is a value obtained by calculating the number of regions in which the number of existing object is equal to or greater than the threshold value. An operation is performed using the image formation time calculated in step S1305 and a predetermined coefficient depending on the number of regions in which the objects densely exist, and processing of calculating the final image formation time is thereby performed.

<Effect>

As described above, in the embodiment, the accuracy of the image formation time estimation for various data features can be improved even in a case of using the aforementioned image formation processing of scan-line method.

Second Embodiment

Figure 15:
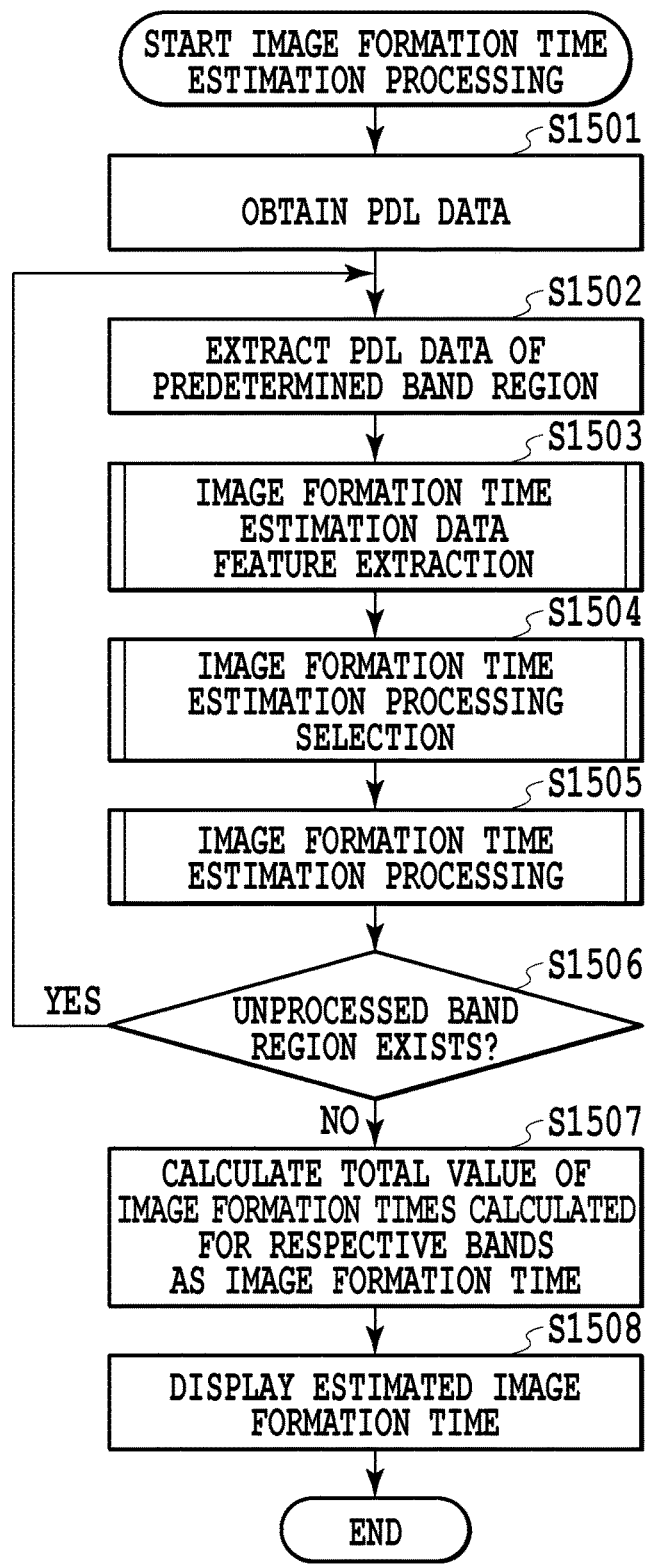
FIG. 15 is a view showing a flow of series of processes in image formation time estimation processing for a page image in second Embodiment.

In first embodiment, description is given of the example in which the selection of image formation time estimation processing shown in FIG. 2 is performed in units of page. In second Embodiment, description is given of an example of achieving the processing in units of predetermined region (here, description is given of a case where the processing is performed in units of band). FIG. 15 shows a flow of series of processes in image formation time estimation processing for a page image in an image processing apparatus of the embodiment, and the flow is executed by a controller 110. The controller 110 executes the processing of FIG. 15 by causing a CPU 120 to load a program for executing the processing of FIG. 2 from a ROM 121 onto a RAM 122 and execute the program.

In step S1501, the CPU 120 performs processing of obtaining PDL data inputted as printing data. In step S1502, the CPU 120 performs processing of extracting, from the obtained PDL data, PDL data located in a predetermined region (in a band in this case).

In step S1503, the CPU 120 performs PDL data feature extraction processing in which the features of rendering objects in the predetermined region included in the obtained PDL data in the predetermined region are extracted. Since this processing is the same as the processing in first embodiment except for the point that a target is processed in units of predetermined region instead of units of page, description thereof is omitted.

In step S1504, the CPU 120 performs image formation time estimation processing selection in which image formation time estimation processing is selected for the PDL data in the predetermined region on the basis of the PDL data features extracted in the PDL data feature extraction processing in step S1503. Since this processing is the same as the processing in first embodiment except for the point that a target is processed in units of predetermined region instead of units of page, description thereof is omitted.

In step S1505, the CPU 120 performs the image formation time estimation processing for the PDL data in the predetermined region by using the image formation time estimation processing selected in step S1504. Since this processing is the same as the processing in first embodiment except for the point that a target is processed in units of predetermined region instead of units of page, description thereof is omitted.

In step S1506, the CPU 120 determines whether an unprocessed band region exists in the PDL data of a page range obtained in step S1501. In a case where an unprocessed band region exists, the processing proceeds to step S1502. In a case where no unprocessed band region exists, the processing proceeds to step S1507. In step S1507, the CPU 120 calculates the total value of the image formation times calculated for the respective bands. In step S1508, the CPU 120 performs processing of displaying the image formation time estimated in step S1507. In practice, the CPU 120 performs processing of notifying a user of the time required for the image formation processing by displaying the image formation time on an operation unit 113 via an operation unit I/F 125.

As described above, as an image formation time estimation method, there may be used a method in which the estimation is made in units of entire page or a method in which the processing time for each of predetermined regions is calculated and the processing times are added up.

Third Embodiment

Next, third embodiment is described. In first embodiment, description is given of the example in which there is one RIP. In third embodiment, description is given of an example in which an image processing apparatus is configured to use two RIPs and hidden surface removal and bitmap image data generation processing after the hidden surface removal are performed respectively by different RIPs.

Figure 16:
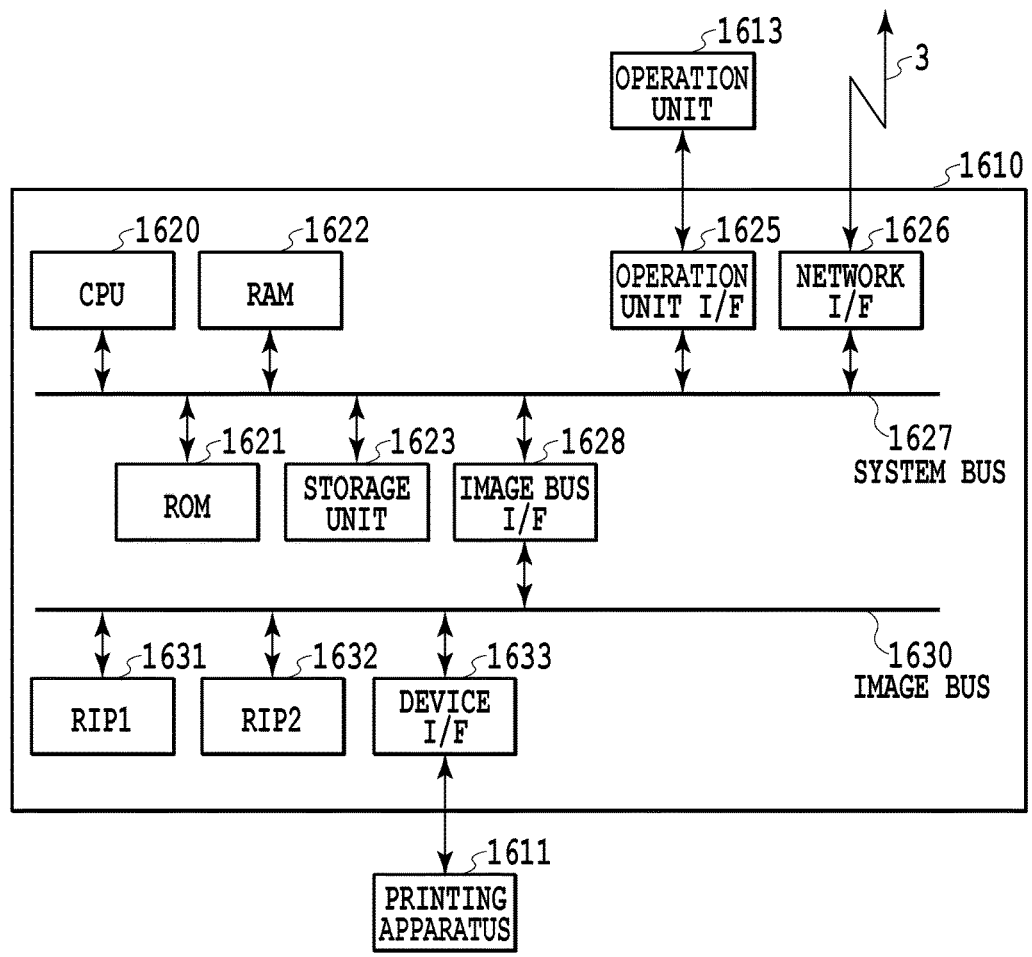
FIG. 16 is a block diagram showing a configuration example including a controller 1610 of an image processing apparatus in third embodiment.

The configuration shown in FIG. 16 is the same as that of first embodiment except that the RIP 131 of first embodiment is replaced by a RIP 1 (1631) and a RIP 2 (1632). The RIP 1 (1631) and the RIP 2 (1632) operate in parallel to perform predetermined image formation processing for a page image. For example, generally-known image formation processing of a scan line method mainly includes two types of large processing of: the hidden surface removal processing in which rendering information of a page is converted to closed region rendering information indicating only the portions to be rendered; and processing of generating a bitmap image on the basis of the information after the hidden surface removal. In the embodiment, as an example, description is given of a configuration in which the RIP 1 (1631) performs image formation processing of performing the hidden surface removal processing and deleting regions not to be rendered. Moreover, as an example, description is given of a configuration in which the RIP 2 (1632) generates the bitmap image on the basis of the closed region information after the hidden surface removal in the image formation processing.

<Image Formation Time Estimation Processing in Image Processing Apparatus>

Since a flow of image formation time estimation processing for a page image in the embodiment can be the same as that in the processing of first or second embodiment, description thereof is omitted.

<Processing of Selecting Image Formation Time Estimation Method for Small Number of Rendering Objects>

Figure 17:
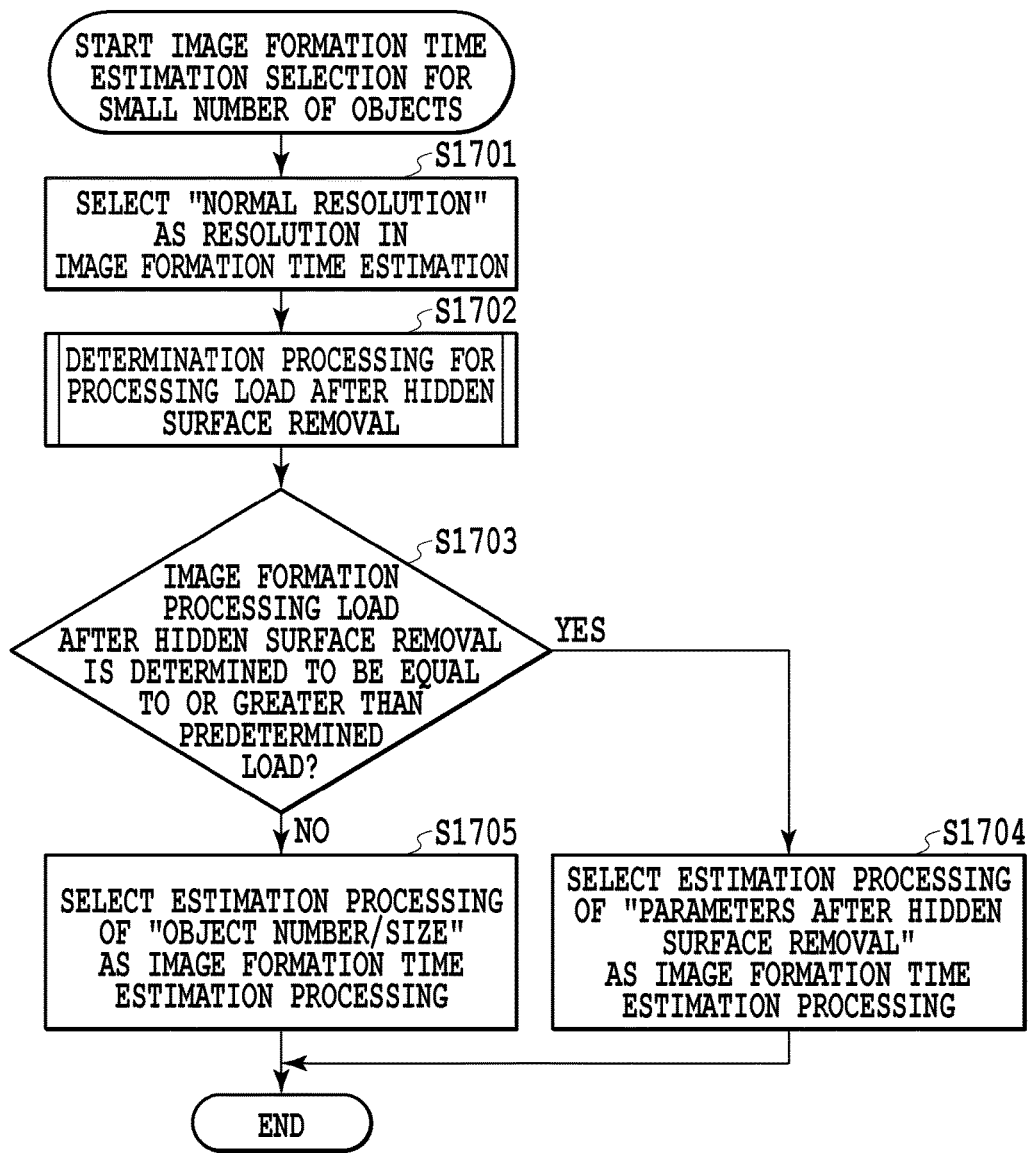
FIG. 17 is a view showing a detailed flow of processing of selecting an image formation time estimation method for small number of rendering objects in third embodiment.

FIG. 17 is a view showing a detailed flow of processing of selecting an image formation time estimation method for small number of rendering objects in the embodiment. Since this processing includes many processes which are basically similar to the processes in FIG. 6, only the different points are described.

In step S1702, a CPU 1620 performs determination processing for a processing load after the hidden surface removal which is part of the image formation processing performed by the RIP 2 (1632) in the image formation processing and in which the CPU 1620 determines whether the load of processing of generating the bitmap image is equal to or greater than a predetermined load from the information after the hidden surface removal. The processing of FIG. 17 is processing performed for a small number of rendering objects. Since the number of objects is small in this processing, it is possible to determine that a load on the RIP 1 (1631) performing the hidden surface removal is small. Hence, in this case, the load on the RIP 1 (1631) is not taken into consideration, but the RIP 2 (1632) may have the predetermined or greater load in performing the bitmap generation processing after the hidden surface removal. Thus, in step S1702, the CPU 1620 determines whether estimation of the image formation time using parameters after the hidden surface removal is necessary. Note that the processing in step S1702 is the same processing as the determination processing for parameters after the hidden surface removal described in FIG. 7. Since the case where the CPU 120 determines that the parameters after the hidden surface removal is necessary in FIG. 7 can correspond to the case where the CPU 1620 determines that there is a predetermined load in the embodiment, description is omitted.

In a case where the CPU 1620 determines that the load of the bitmap generation processing after the hidden surface removal is not equal to or greater than the predetermined load, in step S1703, the CPU 1620 causes the processing to proceed to step S1705 and selects estimation processing of "object number/size" as the method of the image formation time estimation processing.

Meanwhile, in a case where the CPU 1620 determines that the load of the bitmap generation processing after the hidden surface removal is equal to or greater than the predetermined load, the CPU 1620 causes the processing to proceeds to step S1704 and selects estimation processing of "parameters after the hidden surface removal" as the method of the image formation time estimation processing.

<Processing of Selecting Image Formation Time Estimation Method for Large Number of Rendering Objects>

Figure 18:
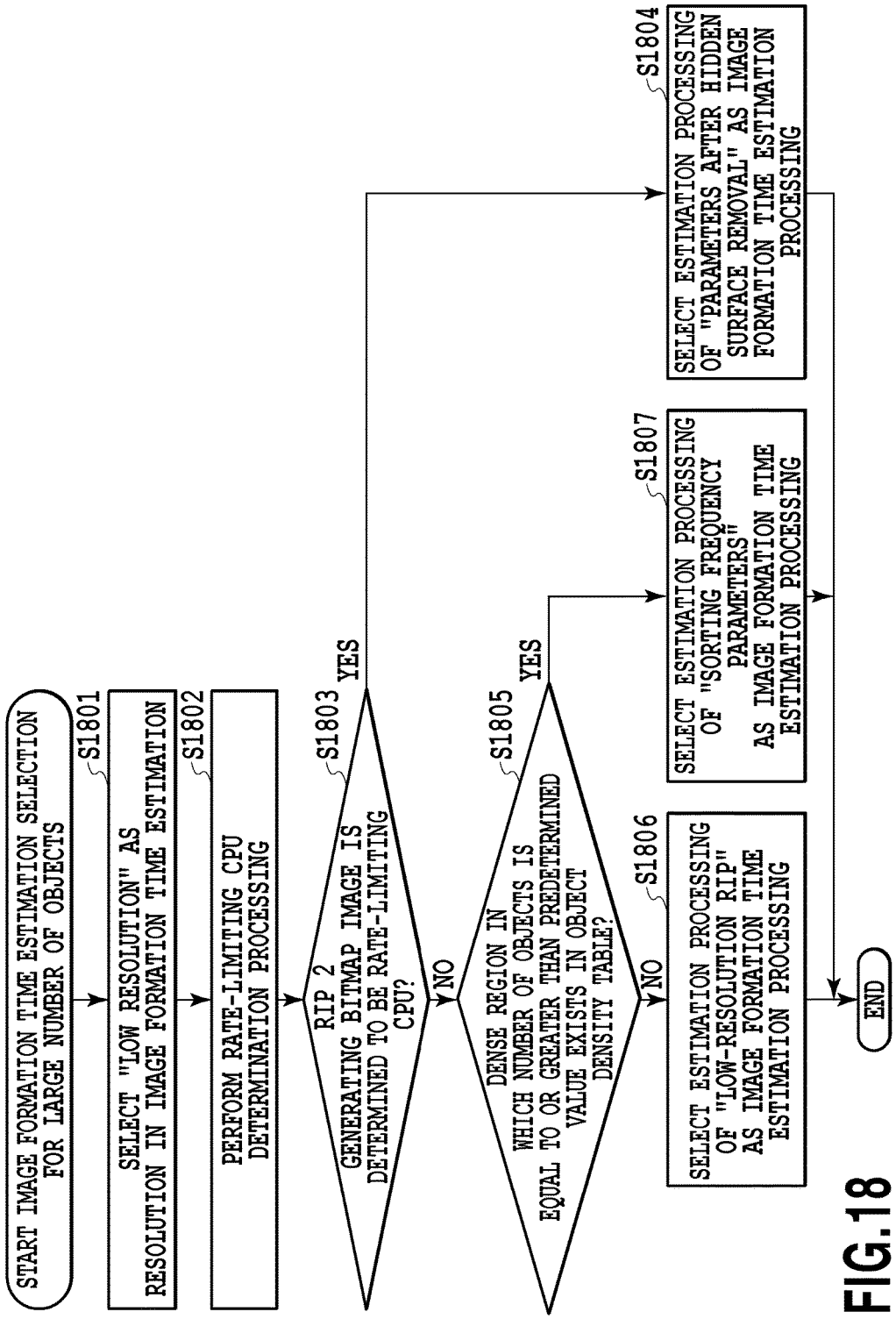
FIG. 18 is a view showing a detailed flow of processing of selecting the image formation time estimation method for large number of rendering objects in third embodiment.

FIG. 18 is a view showing a detailed flow of processing of selecting the image formation time estimation method for large number of rendering objects in the embodiment. Since step S1801 is the same as step S801 described in first embodiment, description thereof is omitted.

In step S1802, the CPU 1620 performs processing of determining which one of the following two types of processing takes more time: the hidden surface removal which is performed in the RIP 1 (1631); and the processing of generating the bitmap image data on the basis of the closed region information after the hidden surface removal which is performed in the RIP 2 (1632). In the embodiment, since the two types of processing are performed in parallel in the two RIPs in the image formation processing, the time for the processing which takes more time is actually the time close to the image formation time. The CPU 1620 thus performs processing of determining which one of the hidden surface removal processing performed in the RIP 1 (1631) and the processing of generating bitmap image data performed in the RIP 2 (1632) takes more time. In step S1803, in a case where the CPU 1620 determines that the processing of generating bitmap image data performed in the RIP 2 take more time, i.e. the RIP 2 is a rate-limiting CPU, the processing proceeds to step S1804. In a case where the CPU 1620 determines that the processing in the RIP 2 takes less time, the processing proceeds to step S1805.

In step S1804, the CPU 1620 selects the estimation processing of "parameters after the hidden surface removal" as the image formation time estimation processing. Specifically, the processing in the RIP 2 which is the processing of generating the bitmap image data and which is processing taking more time in parallel processing is used for the image formation time estimation processing.

In step S1805, the CPU 1620 performs processing determining whether a region in which the number of existing objects is equal to or greater than a predetermined threshold value defined in advance exists in an object density table. In the case where the CPU 1620 determines in step S1805 that a region in which the number of existing objects is equal to or greater than a predetermined threshold value defined in advance exists in the object density table, the processing proceeds to step S1807 and estimation processing of "sorting frequency parameters" is selected as the method of image formation time estimation processing. In a case where no such region exists, the processing proceeds to step S1806 and estimation processing of "low-resolution RIP" is selected.

<Image Formation Time Estimation Processing in Image Processing Apparatus>

Since a flowchart of the image formation time estimation processing is the same as that for the processing of FIG. 9 described in first embodiment, description thereof is omitted. Different points are described below.

The case where the image formation time estimation processing is performed based on the "low-resolution RIP" is a case where the processing of the RIP 1 performing the hidden surface removal processing takes more time. Accordingly, in the estimation processing of "low-resolution RIP", the image formation processing in the RIP 1 (1631) is actually performed, and the actually-measured time of this processing is recognized as the image formation time. However, in the case where the image formation processing in the RIP 1 (1631) is performed in a normal resolution, the processing sometimes takes a long time. Accordingly, the image formation processing in the RIP 1 (1631) is actually performed in a low resolution, and an operation is performed using the actual image formation processing time in the RIP 1 (1631) and a coefficient of a ratio between the normal resolution and the low resolution. The time required for the image formation processing performed by the RIP 1 (1631) is thereby calculated, and the processing of calculating the actual image formation time is performed.

The case where the image formation time estimation processing is performed based on the "parameters after the hidden surface removal" is a case where the processing of the RIP 2 generating the bitmap image data by using the parameters after the hidden surface removal takes more time. Accordingly, in the estimation processing of "parameters after the hidden surface removal", the image formation time estimation processing is performed based on the "parameters after the hidden surface removal" which is processing performed by the RIP 2. A calculation expression is different from that in first embodiment and, since only the processing performed by the RIP 2 (1632) is calculated, the calculation is performed based on the following calculation expression.

<<Estimation Processing of "Parameters after Hidden Surface Removal">>

Image Formation Time=(Total Number of Closed Regions×Coefficient 11)+(Total Number of Closed Region Objects×Coefficient 12)+(Total Number of Closed Region Pixels×Coefficient 13)

In other words, although the time required for the hidden surface removal itself is included in the image formation time estimation in first embodiment, the time required for the hidden surface removal itself is not included in the embodiment because parallel processing is performed.

The case where the estimation processing of "sorting frequency parameters" is performed is a case where the processing of the RIP 1 performing the hidden surface removal processing takes more time. The image formation time estimation processing is thus performed based on the "sorting frequency parameters". In this case, the object order control processing (sorting processing) in the image formation processing is actually performed to calculate the number of times of sorting processing in the order control processing, and the image formation time estimation processing is performed based on the calculated number of times of sorting. In detail, the processing described based on FIG. 14 is performed. However, regarding the calculation expression, since only the processing performed by the RIP 1 (1631) is calculated, the calculation is performed based on the following calculation expression.

<<Estimation Processing of "Sorting Frequency Parameters">>

Image Formation Time=((Number of Times of Insertion Portion Search Processing×Coefficient 21)+(Number of Times of Deletion Object Search Processing×Coefficient 22)+(Total Number of Objects or Total Number of Edges×Coefficient 23))

<Effect>

As described above, in the embodiment, the accuracy of the image formation time estimation for various data features can be improved even in a case of using the aforementioned image formation processing of scan-line method.

Other Embodiments

In the processing described above, the time required to generate the bitmap image data from the PDL data is described as the image formation processing time, and description is given of the case where the image formation processing time is notified to the user. However, the image formation processing time may include times such as the time required to analyze the PDL data and the time required for print processing in which the bitmap image data is outputted to a paper sheet.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-040885, filed Mar. 3, 2014, which is hereby incorporated by reference wherein in its entirety.

What is claimed is:

1. A printing apparatus comprising:
a controller having a processor and a memory storing a program which is executed by the processor, the controller being configured to execute:
receiving page description language (PDL) data including a plurality of objects;
determining whether or not the PDL data includes a greater number of specific type objects than a threshold;
selecting one of a first estimation method and a second estimation method used for estimating a time required to render the PDL data, on a basis of the determination,
wherein the first estimation method determines an overlap region where objects overlap each other and a non-overlap region where an object does not overlap another object, obtains at least information based on the overlap region and information based on the non-overlap region, and estimates the time using at least the obtained information, and
wherein the second estimation method obtains information based on each of the plurality of objects without determining the overlap region and the non-overlap region and estimates the time using at least the obtained information;
estimating the time required to render the PDL data by the selected estimation method; and
displaying, on a display device, time information based on at least the estimated time.

2. The printing apparatus according to claim 1, wherein the first estimation method is selected on the basis of the determination that the PDL data includes the greater number of specific type objects that the threshold, and the second estimation method is selected by the selecting on the basis of the determination that the PDL data does not include the greater number of specific type objects than the threshold.

3. The printing apparatus according to claim 1, wherein the specific type object is a transparent object.

4. The printing apparatus according to claim 1, wherein the specific type object is a clipping object.

5. A printing apparatus comprising:
a controller including one or more processors and a memory storing a program to be executed by the one or more processors; and
a display device,
wherein the controller is configured to execute the program to:
receive PDL data;
detect first and second objects from the PDL data, the second object overlapping partially on the first object;
determine whether the partially overlapping second object is transparent or opaque;
generate first information for time estimation corresponding to a part of the first object where the second object does not overlap on the first object, second information for time estimation corresponding to a part of the second object where the second object does not overlap on the first object, and third information for time estimation corresponding to a part where the second object overlaps partially on the first object, using object information of the first and second objects, on a basis of the determination that the partially overlapping second object is transparent;

estimate a time required to render the PDL data, using at least the generated first, second and third information; and display time information, based on at least the estimated time, on the display device.

6. The printing apparatus according to claim 5, wherein the controller is further configured to:

on the basis of the determination that the partially overlapping second object is opaque, generate the first information corresponding to the part of the first object where the second object does not overlap on the first object and different information for time estimation from the second and third information, the different information corresponding to the part of the second object where the second object does not overlap on the first object and the part where the second object overlaps partially on the first object, and estimate a time required to render the PDL data, using at least the generated first and different information.

7. A controlling method executed by a controller of a printing apparatus, the method comprising:

receiving PDL data including a plurality of objects;

determining whether or not the PDL data includes a greater number of specific type objects than a threshold;

selecting one of a first estimation method and a second estimation method used for estimating a time required to render the PDL data, on a basis of the determination, wherein the first estimation method determines an overlap region where objects overlap each other and a non-overlap region where an object does not overlap another object, obtains at least information based on the overlap region and information based on the non-overlap region, and estimates the time using at least the obtained information, and wherein the second estimation method obtains information based on each of the plurality of objects without determining the overlap region and the non-overlap region and estimates the time using at least the obtained information;

estimating the time required to render the PDL data by the selected estimation method; and displaying, on a display device, time information based on at least the estimated time.

8. The controlling method according to claim 7, wherein the first estimation method is selected by the selecting on the basis of the determination that the PDL data includes the greater number of specific type objects than the threshold, and the second estimation method is selected by the selecting on the basis of the determination that the PDL data does not include the greater number of specific type objects than the threshold.

9. The controlling method according to claim 7, wherein the specific type object is a transparent object.

10. The controlling method according to claim 7, wherein the specific type object is a clipping object.

* * * * *